United States Patent
Motoyama

(10) Patent No.: US 9,560,235 B2
(45) Date of Patent: Jan. 31, 2017

(54) IMAGE SCANNING APPARATUS AND IMAGE READING METHOD USING A FIRST READING HEAD FOR A FIRST SCANNING POSITION AND SECOND READING HEAD FOR A SECOND SCANNING POSITION

(71) Applicant: BROTHER KOGYO KABUSHIKI KAISHA, Nagoya-shi, Aichi-ken (JP)

(72) Inventor: Toshiki Motoyama, Konan (JP)

(73) Assignee: BROTHER KOGYO KABUSHIKI KAISHA, Nagoya-shi, Aichi-ken (JP)

(*) Notice: Subject to any disclaimer, the term of this patent is extended or adjusted under 35 U.S.C. 154(b) by 9 days.

(21) Appl. No.: 14/665,132

(22) Filed: Mar. 23, 2015

(65) Prior Publication Data
US 2015/0281487 A1 Oct. 1, 2015

(30) Foreign Application Priority Data
Mar. 28, 2014 (JP) ................... 2014-067623

(51) Int. Cl.
| | | |
|---|---|---|
| G06F 3/12 | (2006.01) | |
| H04N 1/00 | (2006.01) | |
| H04N 1/04 | (2006.01) | |
| H04N 1/40 | (2006.01) | |

(52) U.S. Cl.
CPC ........ H04N 1/0408 (2013.01); H04N 1/00822 (2013.01)

(58) Field of Classification Search
CPC combination set(s) only.
See application file for complete search history.

(56) References Cited

U.S. PATENT DOCUMENTS

| | | |
|---|---|---|
| 6,975,435 B1 | 12/2005 | Maitani et al. |
| 2008/0266617 A1* | 10/2008 | Suzuki ............... H04N 1/4076 358/474 |
| 2012/0170083 A1* | 7/2012 | Joh .................. H04N 1/00013 358/475 |

FOREIGN PATENT DOCUMENTS

| | | |
|---|---|---|
| JP | 2000-270172 A | 9/2000 |
| JP | 2005-184489 A | 7/2005 |
| JP | 2006-261936 A | 9/2006 |
| JP | 2007-074554 A | 3/2007 |
| JP | 2008-278277 A | 11/2008 |

* cited by examiner

Primary Examiner — Barbara Reiner
Assistant Examiner — Henok A Shiferaw
(74) Attorney, Agent, or Firm — Merchant & Gould P.C.

(57) ABSTRACT

An image scanning apparatus has a conveyer, a first scanning device configured to scan an image on one surface of an original sheet at a first scanning position, a second scanning device configured to scan an image on an other surface of the original sheet at a second scanning position. A controller is configured to execute a first adjustment process to adjust light amount adjustment of the first scanning device before scanning the original sheet subject to the received scanning instruction, start scanning after the first adjustment process, execute a determination process to determine, after starting conveying the original sheet, whether a light adjustment of the second scanning device is to be executed, execute a second adjustment process, when it is determined to start the light adjustment of the second scanning device, and stop conveying the original sheet when no original sheet is located at the first scanning position.

18 Claims, 12 Drawing Sheets

IMAGE SCANNING APPARATUS AND IMAGE READING METHOD USING A FIRST READING HEAD FOR A FIRST SCANNING POSITION AND SECOND READING HEAD FOR A SECOND SCANNING POSITION

This application claims priority under 35 U.S.C. §119 from Japanese Patent Application No. 2014-067623 filed on Mar. 28, 2014. The entire subject matter of the application is incorporated herein by reference.

BACKGROUND

Technical Field

The present disclosures relate to an image scanning apparatus provided with a plurality of scanning devices. Specifically, the present disclosures relate to a preparation operation for scanning of each of the plurality of image scanning devices.

Related Art

Conventionally, in image scanning apparatuses, adjustment of amount of light of image sensors are performed as preparation operations before starting scanning operations. For example, in response to receipt of a scanning instruction, an image sensor of such an image scanning apparatus is moved to a position where the image sensor faces a standard white plate. Then, a light source of the image sensor is caused to emit light. Then, the light reflected by the standard white plate is received by the image sensor, and based on the amount of light (hereinafter, referred to as ""light amount"") of the received light, light amount of the light emitted by the light source is adjusted.

SUMMARY

Recently, the image scanning apparatus provided with a plurality of scanning devices has become widely used. However, the preparation operation for the image scanning apparatus having a plurality of scanning devices has not been developed, and a suitable preparation operation has been desired.

According to aspects of the disclosures, there is provided an image scanning apparatus which is provided with a conveyer configured to convey an original sheet, a first scanning device configured to scan an image on one surface of the original sheet conveyed by the conveyer at a first scanning position, a second scanning device configured to scan an image on an other surface of the original sheet conveyed by the conveyer at a second scanning position, and a controller. The controller is configured to execute a first adjustment process to execute, in response to receipt of a scanning instruction, a light amount adjustment of the first scanning device before starting scanning of the original sheet subject to the received scanning instruction, a starting process to start conveying and scanning of the original sheet after executing the first adjustment process, a determination process to determine, after starting conveying the original sheet by executing the starting process, whether a light adjustment of the second scanning device is to be started, a second adjustment process to execute, when it is determined to start the light adjustment of the second scanning device, the light adjustment of the second scanning device, and a stoppage process to stop conveying the original sheet such that the original sheet is not stopped at the first scanning position.

According to aspects of the disclosures, there is provided a non-transitory computer-readable recording medium for an image scanning apparatus having a conveyer configured to convey an original sheet, a first scanning device configured to scan an image on one surface of the original sheet conveyed by the conveyer at a first scanning position, a second scanning device configured to scan an image on an other surface of the original sheet conveyed by the conveyer at a second scanning position, and a controller. The recording medium storing instructions which, when executed by the controller, cause the image scanning apparatus to execute a first adjustment process to execute, in response to receipt of a scanning instruction, a light amount adjustment of the first scanning device before starting scanning of the original sheet subject to the received scanning instruction, a starting process to start conveying and scanning of the original sheet after executing the first adjustment process, a determination process to determine, after starting conveying the original sheet by executing the starting process, whether a light adjustment of the second scanning device, a second adjustment process to execute, when it is determined to start the light adjustment of the second scanning device, the light adjustment of the second scanning device, and a stoppage process to stop conveying the original sheet such that the original sheet is not stopped at the first scanning position.

BRIEF DESCRIPTION OF THE ACCOMPANYING DRAWINGS

Figure 6:
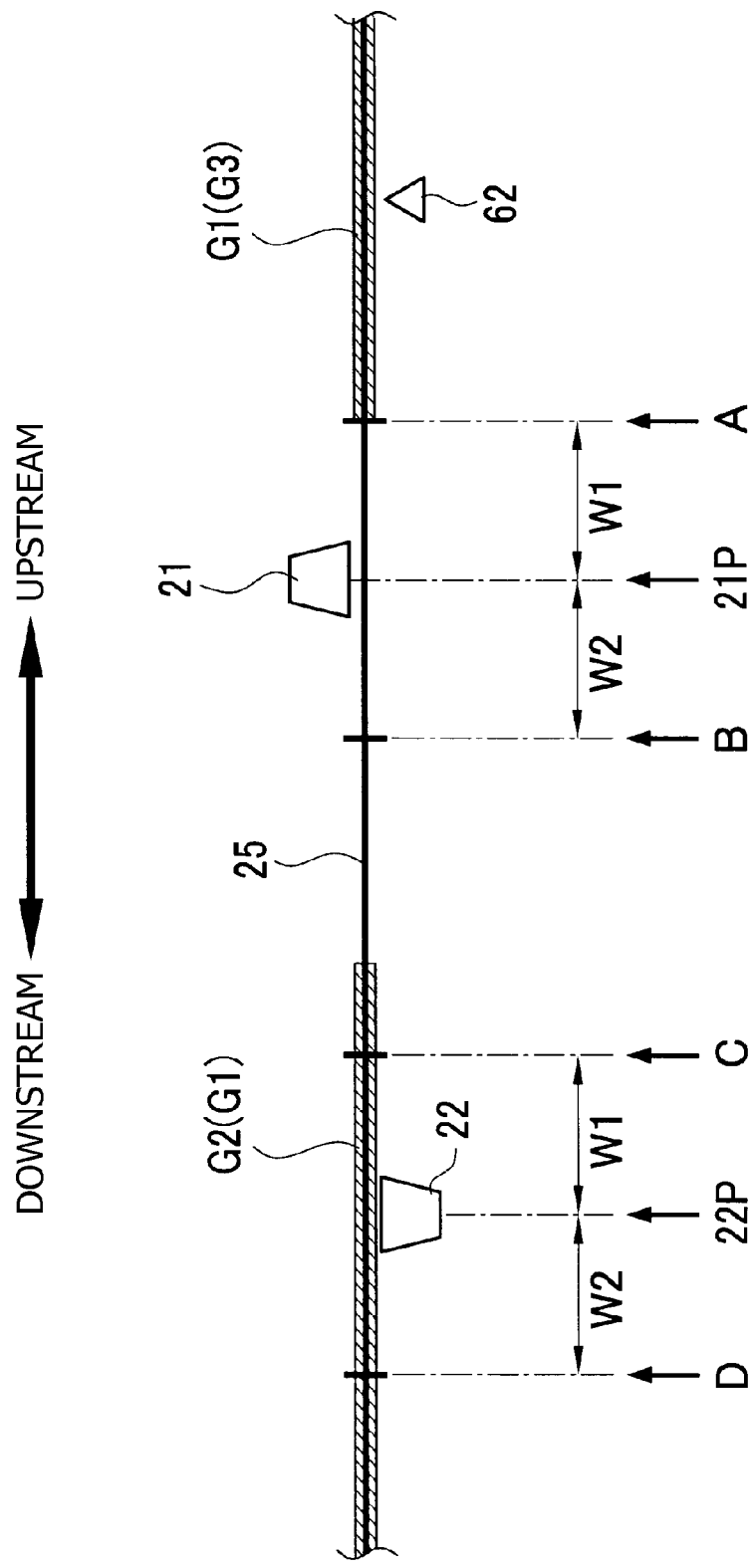

FIG. 6 schematically shows sheet stop positions when a first operation is executed.

Figure 7:
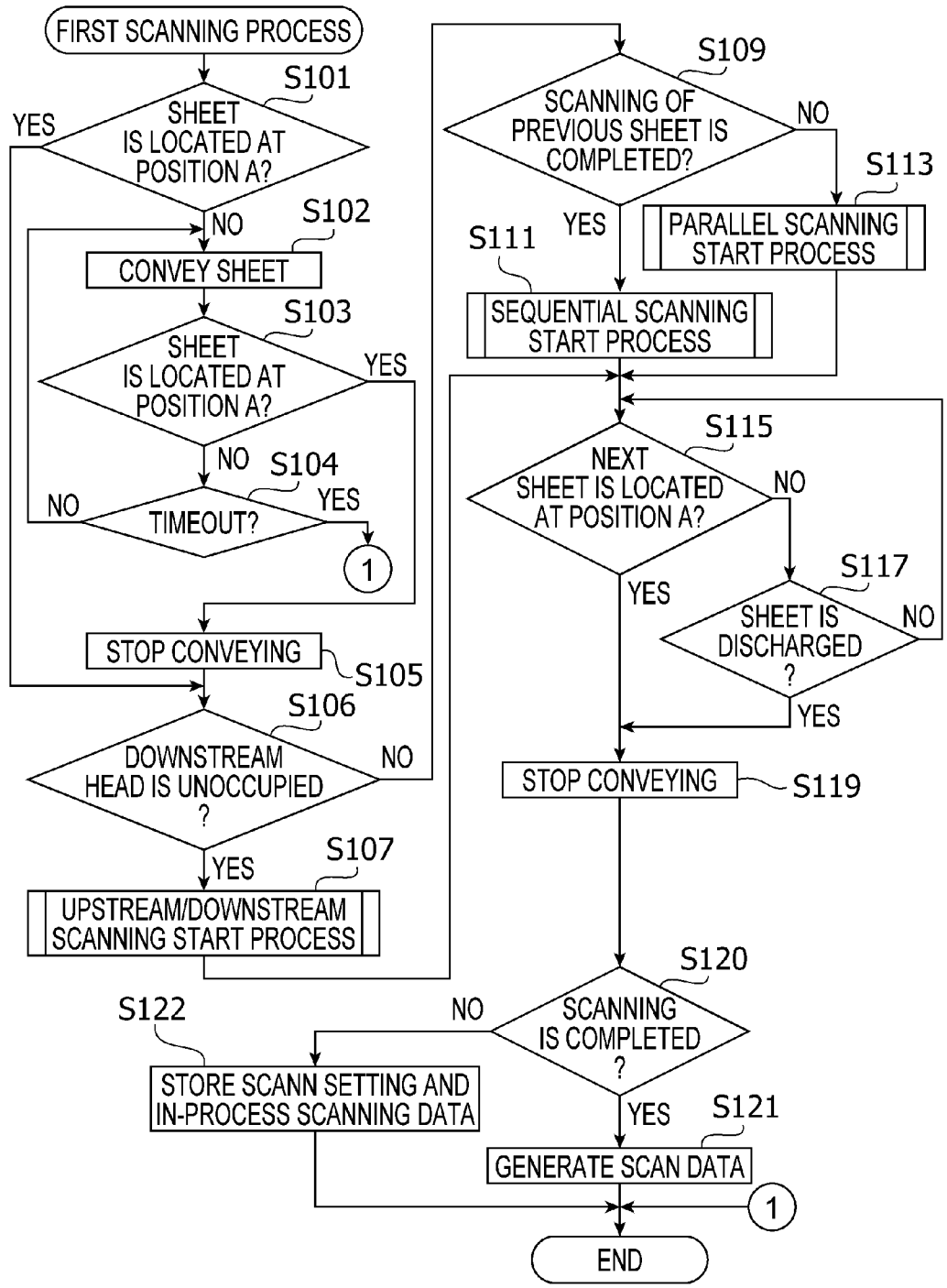

FIG. 7 is a flowchart illustrating a first scanning process according to the aspects of the disclosures.

Figure 8:
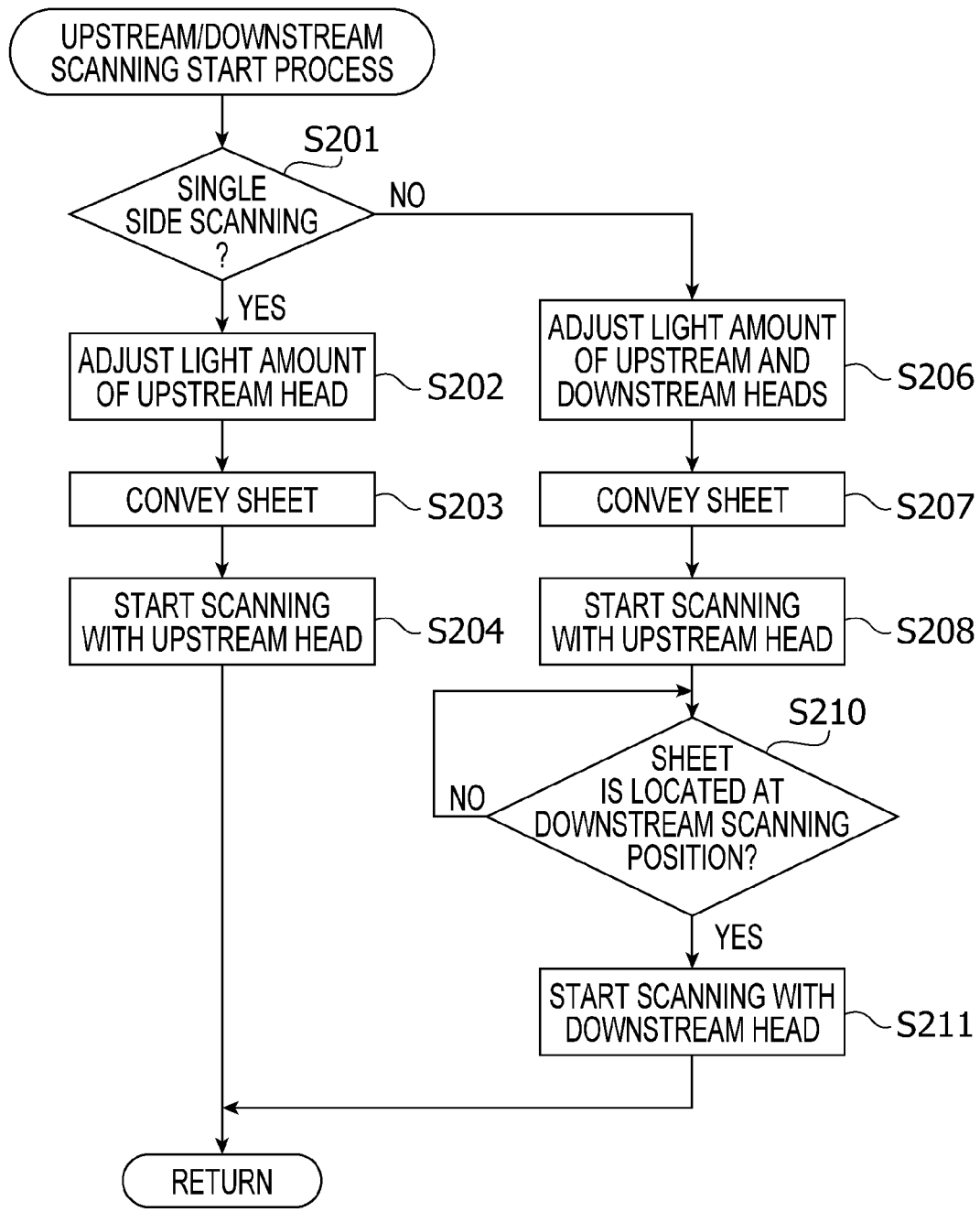

FIG. 8 is a flowchart illustrating an upstream/downstream scanning start process according to the aspects of the disclosures.

Figure 9:
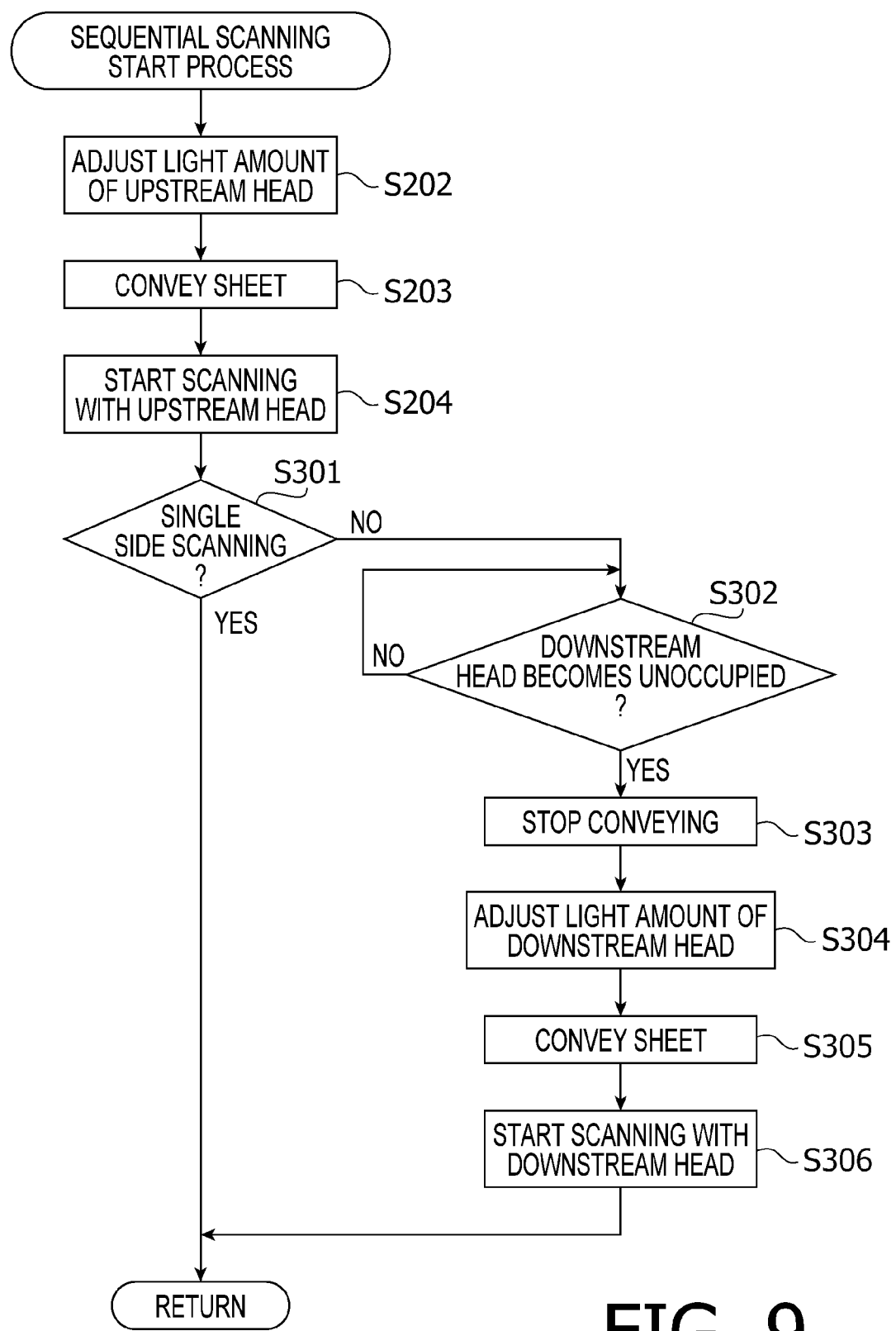

FIG. 9 is a flowchart illustrating a sequential scanning start process according to the aspects of the disclosures.

Figure 10:
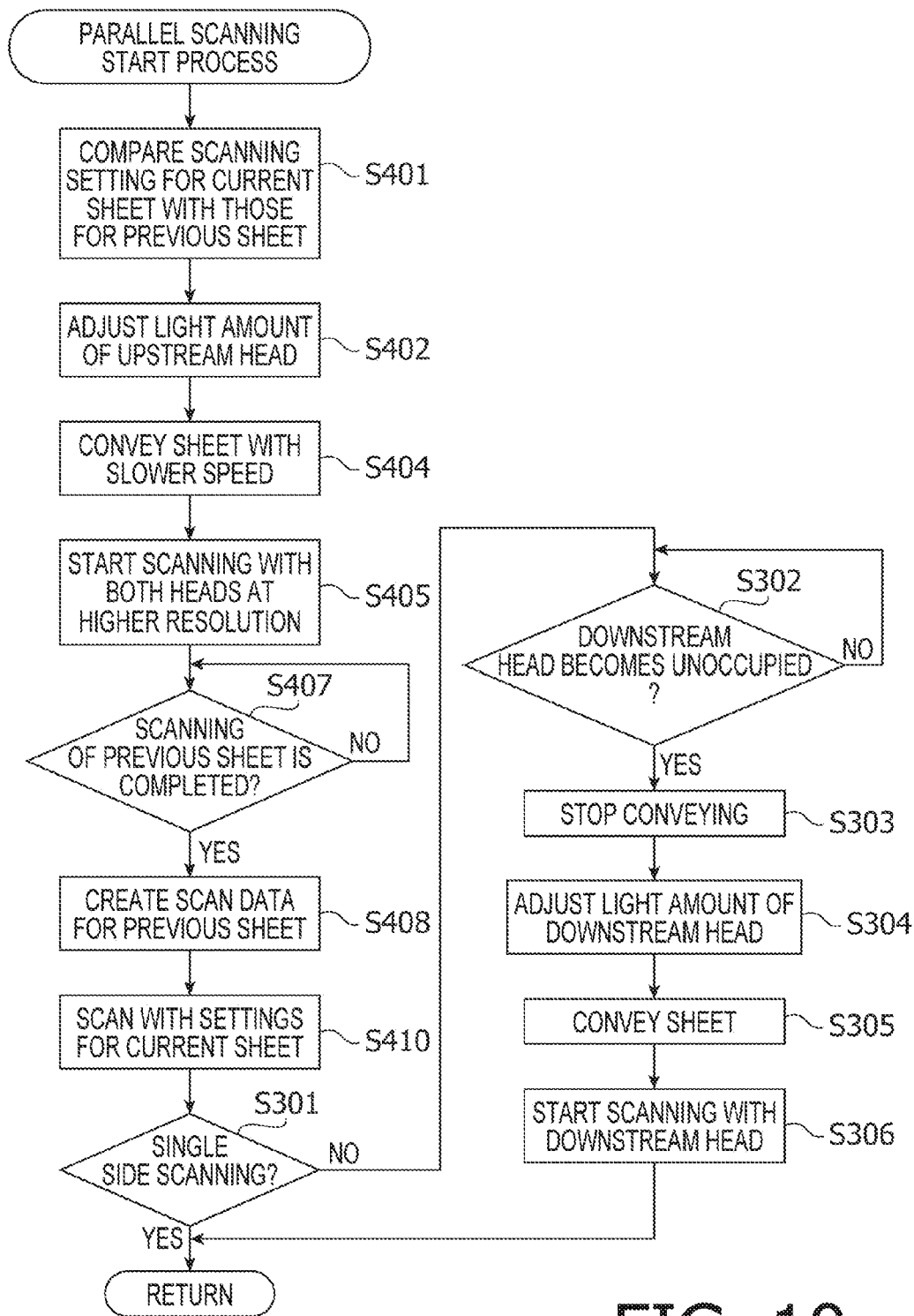

FIG. 10 is a flowchart illustrating a parallel scanning start process according to the aspects of the disclosures.

Figure 11:
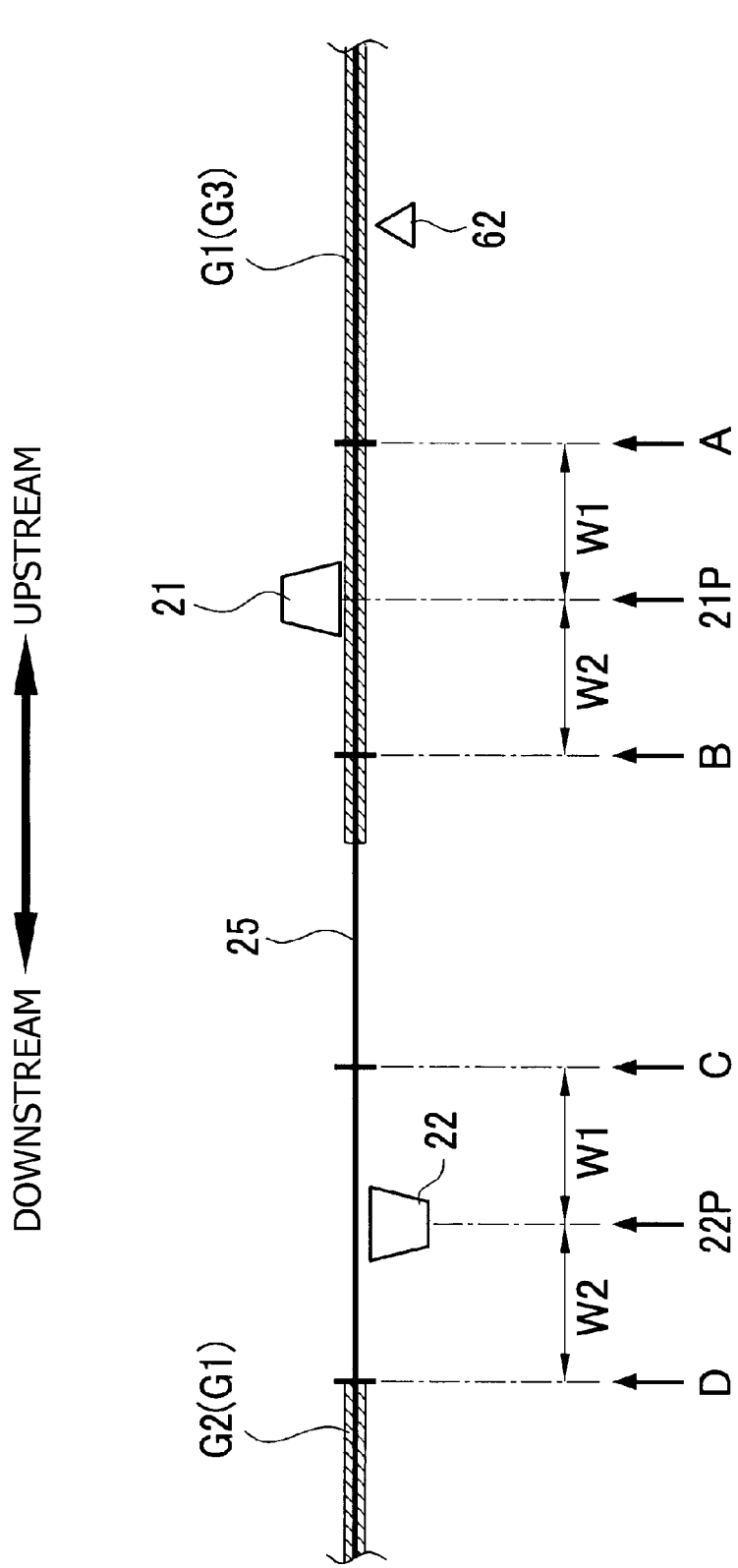

FIG. 11 schematically shows sheet stop positions when a second operation is executed.

Figure 12:
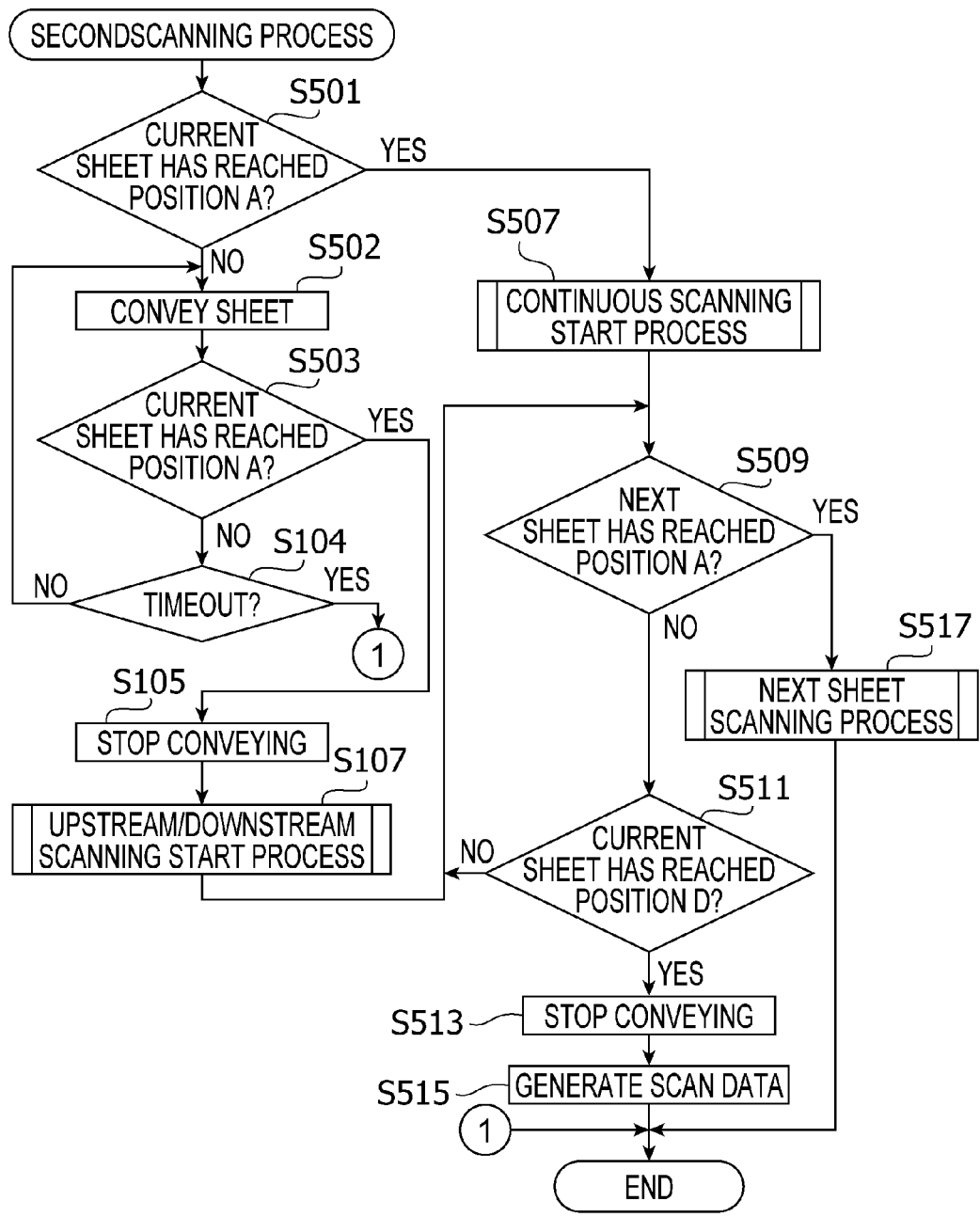

FIG. 12 is a flowchart illustrating a second scanning process according to aspects of the disclosures.

Figure 13:
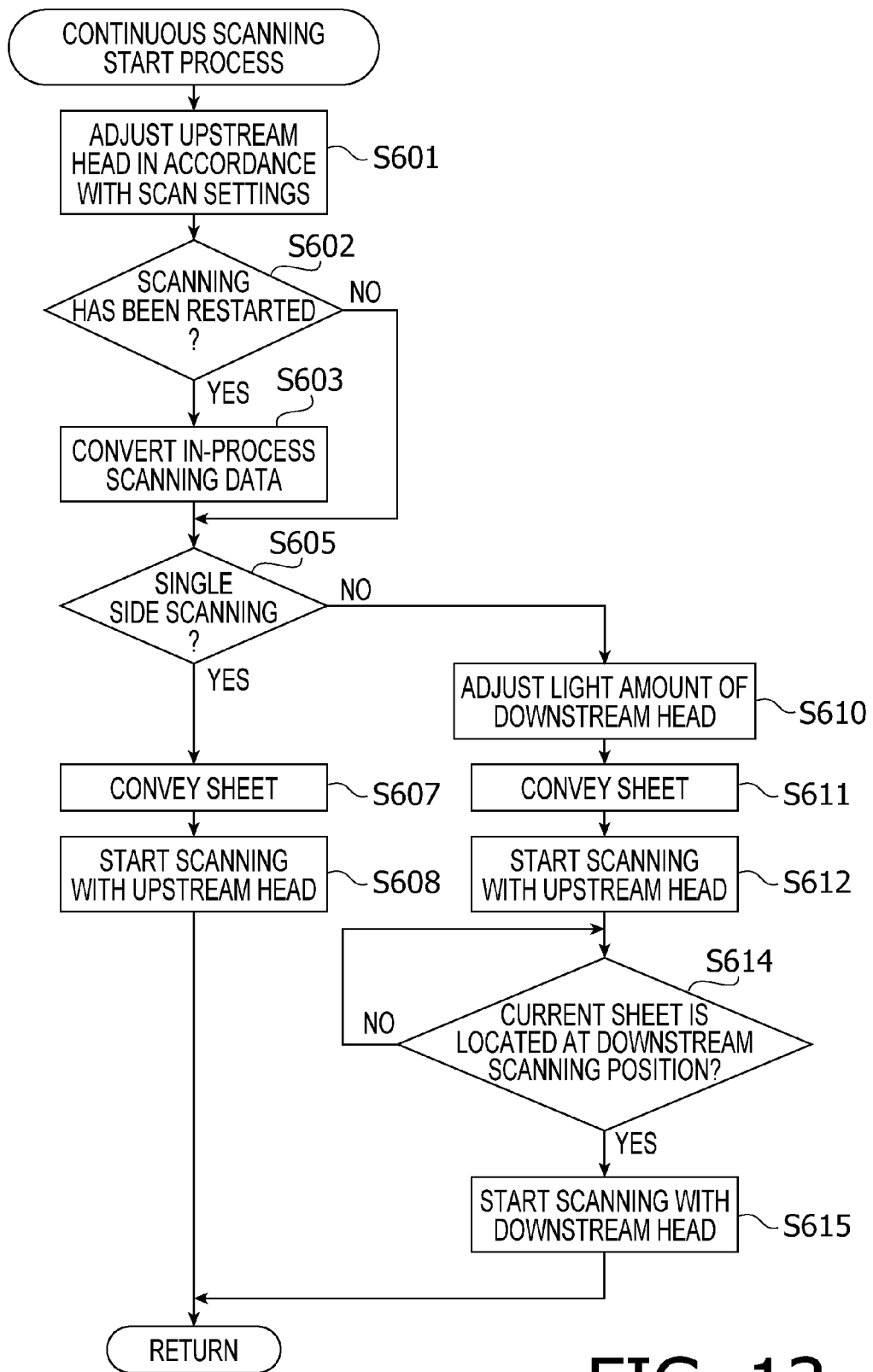

FIG. 13 is a flowchart illustrating a continuous scanning start process according to the aspects of the disclosures.

Figure 14:
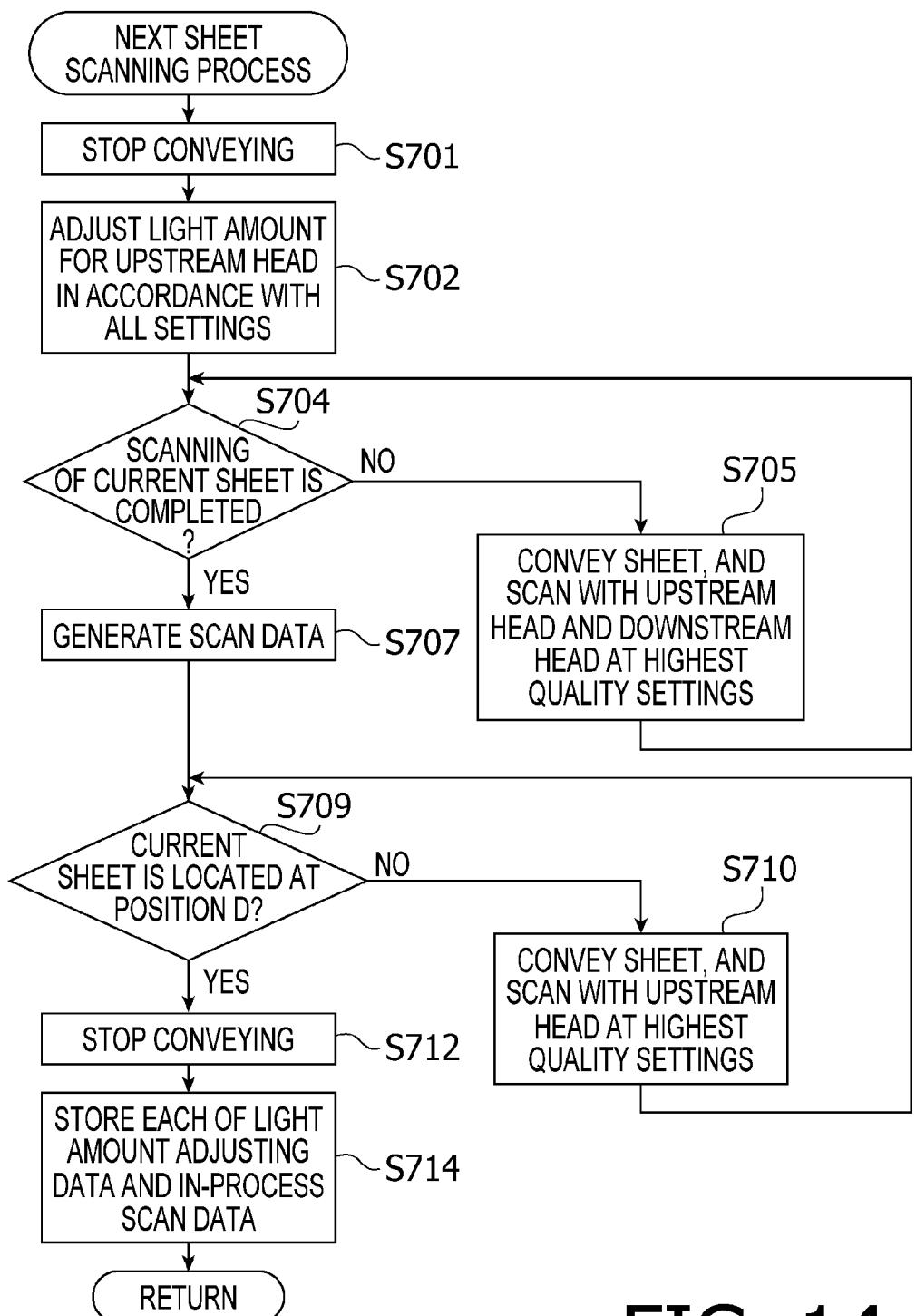

FIG. 14 is a next sheet scanning process according to the aspects of the disclosures.

DETAIL DESCRIPTION OF THE EMBODIMENTS

Hereinafter, referring to the accompanying drawings, a scanner according to an illustrative embodiment of the aspects of the disclosures will be described in detail.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories. EEPROMs. CD-media, DVD-media, temporary storages, hard disk drives, floppy drives, permanent storages, and the like.

Figure 1:
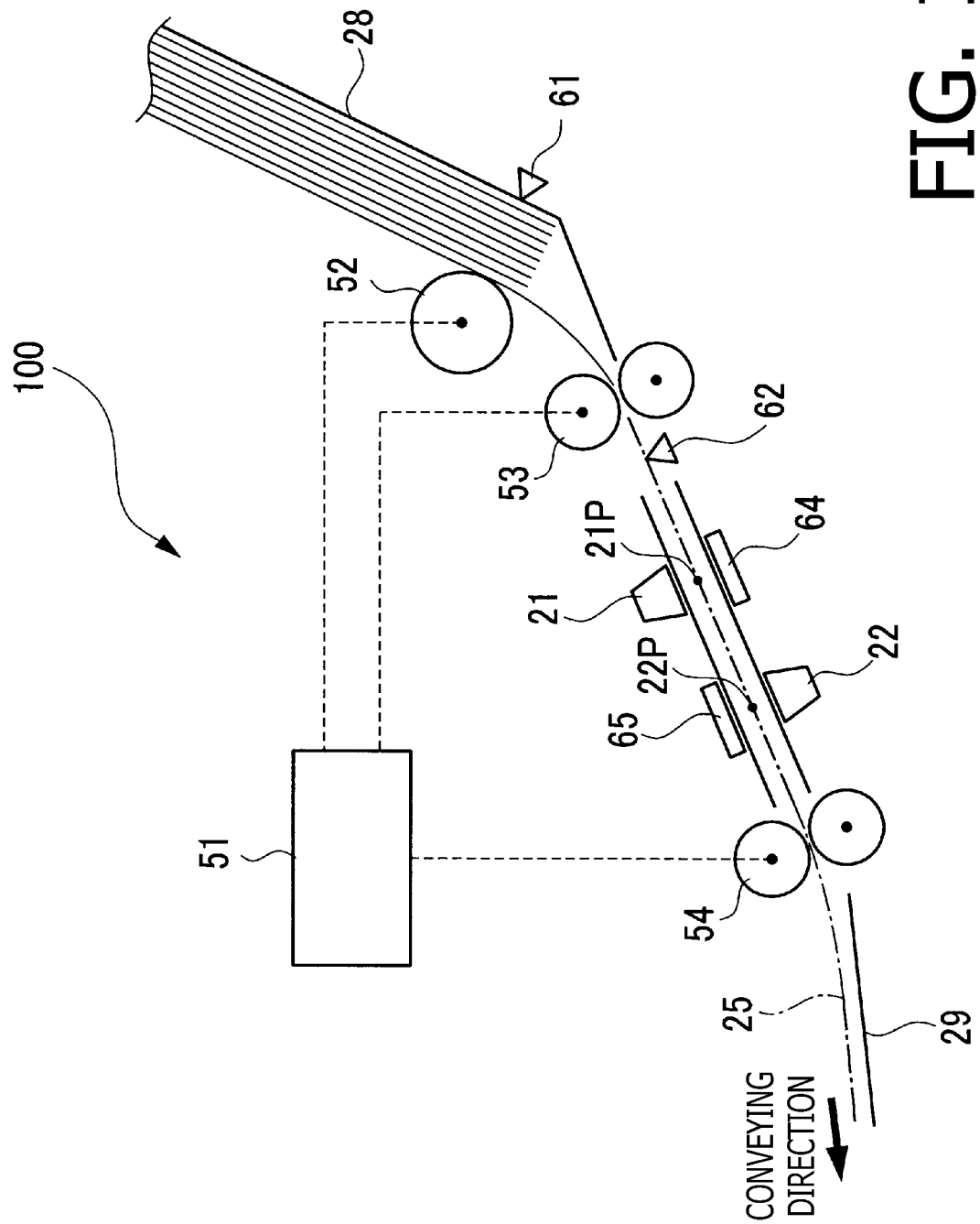
FIG. 1 is a cross sectional side view schematically showing main components of a scanner according to aspects of the disclosures.

As shown in FIG. 1, a scanner 100 according to the illustrative embodiment has a scanning head 21 and another scanning head 22, which are configured to scan images on different surfaces of a conveyed original sheet. According to the illustrative embodiment, a scanning position 21P of the scanning head 21 and a scanning position 22P of the scanning head 22 are spaced by a predetermined distance.

Each of the scanning heads 21 and 22 has a light emitting element and a light receiving element. Light is emitted to the original sheet from the light emitting element, and the light receiving element receives the light reflected by the original sheet and outputs a signal corresponding to the amount of the received light. The scanner 100 thus scans images on the original sheet based on the signals transmitted from the scanning heads 21 and 22. According to the illustrative embodiment, when a single side scanning is performed (i.e., when an image on only one side of the original sheet is to be scanned), the scanning head 21 is used. Further, a surface of the original sheet to be scanned by the scanning head 21 will be referred to as a front surface, and a surface of the original sheet to be scanned by the scanning head 22 will be referred to as a back surface for the purpose of description.

According to the illustrative embodiment, a sheet conveying path 25 is defined. The sheet conveying path 25 is formed to pass through the scanning position 21P of the scanning head 21 and the scanning position 22P of the scanning head 22. The original sheet is conveyed, one by one, along the sheet conveying path 25. A sheet conveying direction in the sheet conveying path 25 is a direction from the scanning head 21 toward the scanning head 22. Thus, the scanning position 21P of the scanning head 21 is located on an upstream side with respect to the scanning position 22P of the scanning head 22. In this regard, the scanning head 21 will occasionally be referred to as the upstream scanning head 21, and the scanning head 22 will occasionally be referred to as the downstream scanning head 22.

Further, as shown in FIG. 1, the scanner 100 has an original sheet tray 28 configured to accommodate original sheets which will be scanned, and an original discharge tray 29 configured to accommodate the original sheets which have been scanned. Further, the scanner 100 has a conveying motor 51, a feed roller 52, and a plurality of conveying roller pairs 53 and 54, which are driven to convey the original sheets accommodated in the original sheet tray 28 toward the original discharge tray 29, along the conveying path 25.

The feed roller 52 is configured to feed the original sheet accommodated in the original sheet tray 28 to the conveying path 25 one by one. The original sheet fed by the feed roller 52 is conveyed along the conveying path 25 by the plurality of conveying roller pairs 53 and 54. According to the illustrative embodiment, the feed roller 52, the conveying roller pair 53 and the conveying roller pair 54 rotate as a driving force of the conveying motor 51 is transmitted.

To the feed roller 52, a gear is formed for receiving the driving force transmitted from the conveying motor 51. After one original sheet is fed by the feed roller 52, the gear keeps rotating idly for a certain period so that the rotation of the conveying motor 51 is not transmitted for the certain period during which the gear idly rotates. With this configuration, two original sheets successively fed from the original sheet tray 28 to the conveying path 25 are spaced by a predetermined distance. This spaced distance differs depending on a size of the original sheet in the conveying direction. In the following description, this distance between the successively conveyed two original sheets will be referred to as a sheet distance.

Except for the above-described idly rotating period of the gear of the feed roller 52, the feed roller 52 and the conveying roller pairs 53 and 54 start and stop rotating synchronously with the operation of the conveying motor 51. Accordingly, when a plurality of original sheets are conveyed successively, the plurality of the original sheets in the conveying path 25 proceed at the same speed. After one original sheet is fed to the conveying path 25, if there exist another original sheet inside the original sheet tray 28, it is fed successively with the appropriate sheet distance formed between the previously fed original sheet.

According to the illustrative embodiment, a scanning setting is used for setting various parameters for scanning, and the scanning setting includes a setting of a scanning area. The scanning area is an area subject to scanning. For example, the scanning area is designated by a user through a scanning instruction. The scanning area may be larger than the size of the original sheet to be scanned, or may be smaller than the size of the original sheet to be scanned. When the scanning area of the original sheet is passing the scanning positions 21P and 22P of the scanning heads 21 and 22, the scanner 100 performs the scanning operation. When the entire scanning area has passed the scanning positions 21P and 22P, the scanning of the original sheet is completed.

Figure 2:
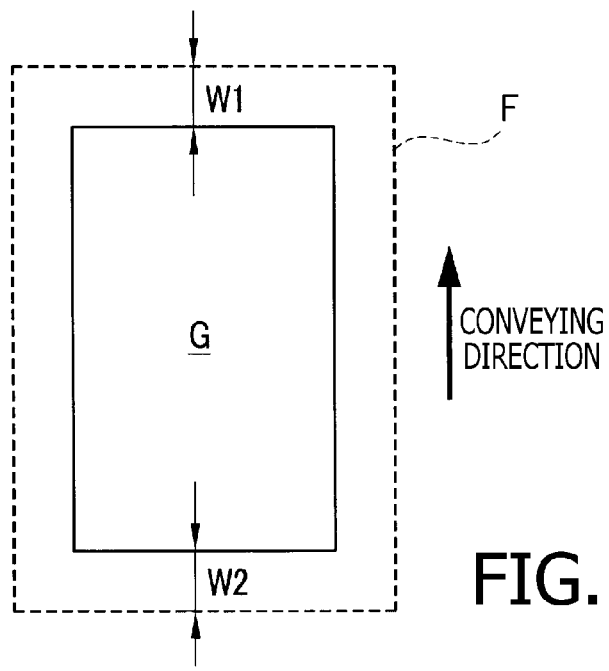
FIG. 2 is a chart illustrating an example of scanning area when an over-scanning is performed.

According to the illustrative embodiment, the scanning operation may be performed according to an over-scan setting, which is a scanning of the scanning area F larger than the size G of the original sheet (see FIG. 2) can be performed. According to this example, the scanning area F is defined such that the size G of the original sheet is expanded by a predetermined width with respect each side of the original sheet (i.e., original size). It is noted that, in this example, this predetermined width may be the same with respect to each of the sides (as shown in FIG. 2), or may be different for each of the sides. For example, in order to deal with a skew condition (i.e., the sheet is conveyed with its orientation being inclined with respect to the conveying direction). Further, the user may designate the over-scanning setting in accordance with his/her intent.

For example, it is possible to obtain a skew amount (e.g., parameters representing the skew condition) of an original sheet G by scanning a leading end of the original sheet G with the over-scan setting. In such a case, based on the skew amount as obtained, a scanning area for scanning a trailing end of the original sheet G can be determined. That is, the scanning area may be dynamically changed during the scanning operation so that the entire area of the skewed original sheet G can be included in the scanning area. Further, when the sheet distance is obtained, the scanning area for the subsequently conveyed original sheet may be determined based on the position of the trailing end of the preceding original sheet and the sheet distance. That is, determination whether the scanning operation is completed or not could be made depending on the skew amount of the original sheet or the sheet distance.

Figure 3:
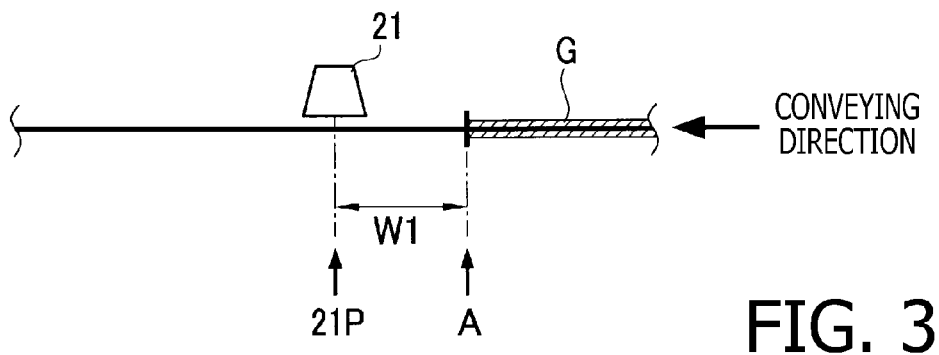
FIG. 3 shows a scanning start position when the over-scanning is performed.
Figure 4:
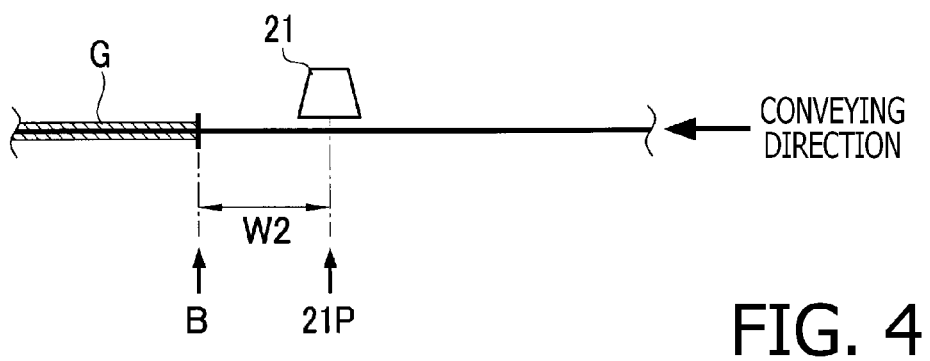
FIG. 4 shows a scanning end position when the over-scanning is performed.

When the scan setting of the received scanning instruction represents the over-scan setting, the scanner 100 starts the scanning operation at a position on the downstream side, by an amount W1, with respect to the leading end of the original sheet G. For example, as shown in FIG. 3, when the leading end of the original sheet G reaches a position A, which is a position on the upstream side, in the sheet conveying direction, with respect to the scanning position 21P of the scanning head 21 by the amount W1, the scanning operation with the scanning head 21 is started. As shown in FIG. 4, when the trailing end of the original sheet G reaches a position B, which is a position on the downstream side, in the sheet conveying direction, with respect to the scanning position 21P of the scanning head 21, the scanning operation with the scanning head 21 is terminated. Although not described, the scanning head 22 could be controlled to operate in a similar manner.

That is, according to the illustrative embodiment, from a position frontward from the leading end of the original sheet by the width W1 to a position rearward from the trailing end of the original sheet by the width W2 could be the scanning area of the scanner 100. It is noted that, according to the scanner 100, the sheet distance is greater than a sum of the width W1 and the width W2. Therefore, even when the scanning instruction with the over-scan setting is received for both of the continuously conveyed two original sheets, the scanning areas for both the sheets will not overlap, and each scan area can be appropriately scanned.

Further, the scanner has a sheet sensor 61 configured to detect presence/absence of the original sheets in the original sheet tray 28, and a conveying sensor 62 configured to detect presence/absence of the original sheet in the conveying path 25 at a predetermined position. Each of the original sheet sensor 61 and the conveying sensor 62 is, for example, a light reflective type sensor or a light transmission sensor provided with a rocking member. Each of the above sensors 61 and 62 is configure to output a signal having different output level depending on whether one (or more) original sheet exists at its detection position.

According to the illustrative embodiment, the detection position of the original sheet sensor 61 is a position inside the original sheet tray 28. The detection position of the conveying sensor 62 is a position on a downstream side with respect to the original sheet tray 28 and on an upstream side with respect to the scanning position 21P of the scanning head 21. The scanner 100 is configured to detect presence/absence of the original sheet at the detection positions. The scanner 100 obtains a position of the leading end and/or the trailing end of the original sheet which is being conveyed based on the driving amount of the conveying motor 51 after the leading end or the trailing end of the original sheet is detected by the conveying sensor 62.

Further, the scanner 100 is provided with standard white plates 64 and 65 at positions facing the scanning heads 21 and 22, respectively. The standards white plates 64 and 65 are used to adjust the amount of light emitted by the scanning heads 21 and 22, respectively. For example, when the light amount of the scanning head 21 is to be adjusted, the scanning heads 21 is caused to scan the standard white plate 64 without the original sheet located at the scanning position 21P. That is, the scanner 100 adjusts the amount of the emitted light of the scanning head 21 based on the amount of the light emitted to the standard white plate 64 and reflected thereby. The adjustment of the light amount is performed for each of the scanning heads 21 and 22.

The adjustment of the light amount is performed when the original sheet is not located at the scanning positions 21P or 22P. It is noted that, even if the original sheet is not located at the scanning position 21P or 22P, if the light adjustment is performed before the scanning of the original sheet has not been completed because of the over-scan setting or the like, a scanning condition of the original sheet currently being scanned changes, and such a change is not preferable.

It is noted that whether the original sheet is located at the scanning positions 21P and 22P can be determined based on the output signal of the conveying sensor 62. For example, based on the driving amount of the conveying motor 51 after the trailing end of the preceding original sheet is detected by the conveying sensor 62, it is determined that the preceding original sheet has passed the scanning positions 21P and 22P. Further, based on the driving amount of the conveying motor 51 after the leading end of the next original sheet is detected by the conveying sensor 62, it is determined whether the next original sheet has reached the scanning position 21P or 22P. Further, when the skew amount and/or sheet distance of the next original sheet has been obtained, the determination may be made taking such amounts into account.

The light amount adjustment of the scanning heads 21 and 22 is performed when there is no original sheet at the scanning positions 21P or 22P, and the scanning heads 21 or 22 is not being operated to scan an image (i.e., not in a scanning period). It is noted that the scanning period is not limited to a period in which the original sheet is being conveyed, or a period in which the scanning head 21 or 22 is emitting the light. In the following description, a state in which the light amount adjustment can be performed (i.e., a state where no original sheet exists or being conveyed at the scanning positions 21P or 22P) is expressed such that the scanning head 21 (or 22) is unoccupied.

According to the illustrative embodiment, the light emitting elements subject to the light amount adjustment may be different depending on whether a color scanning or a monochromatic scanning is to be performed, a scanning resolution and the like, which are all represented by the scanning setting. Accordingly, the light amount adjustment operation may be different depending on contents of the scanning setting. According to the illustrative embodiment, therefore, the light amount adjustment is performed for each scanning job, before the scanning operation is performed based on the scanning instruction for a scanning job, after receiving the scanning instruction. For example, when the scanning instruction to continuously scan a plurality of original sheets, the light amount adjustment is performed before the scanning of the first sheet of the plurality of original sheets is performed.

According to the illustrative embodiment, the scanner 100 is configured to accept the scanning instruction of a one-sheet scanning job, which is a scanning job terminated every time one original sheet has been scanned. When the scanning instruction of the one-sheet scanning job is received, even if a plurality of original sheets are accommodated in the original sheet tray 28, only one of the original sheets is scanned. Further, when the scanning instruction of the one-sheet scanning job is received, the scanner 100 performs the light amount adjustment every time the scanning job is performed. That is, when the scanning instruction of the one-sheet scanning job is received, the light amount adjustment is performed every time before the one original sheet, which is instructed to be scanned, is scanned.

According to the illustrative embodiment, the sheet conveying speed may be changed depending on the scanning setting. For example, when the scanning resolution is relatively high, the scanning operation is performed with conveying the original sheet at a relatively slow speed, while when the resolution of the scanning setting is relatively low, the scanning operation is performed with conveying the original sheet at a relatively high speed. As mentioned above, the feed roller 52 and the conveying roller pairs 53 and 54 are driven by the single conveying motor 51, simply by changing the rotation speed of the conveying motor 51, the conveying speed of the original sheets are changed.

Figure 5:
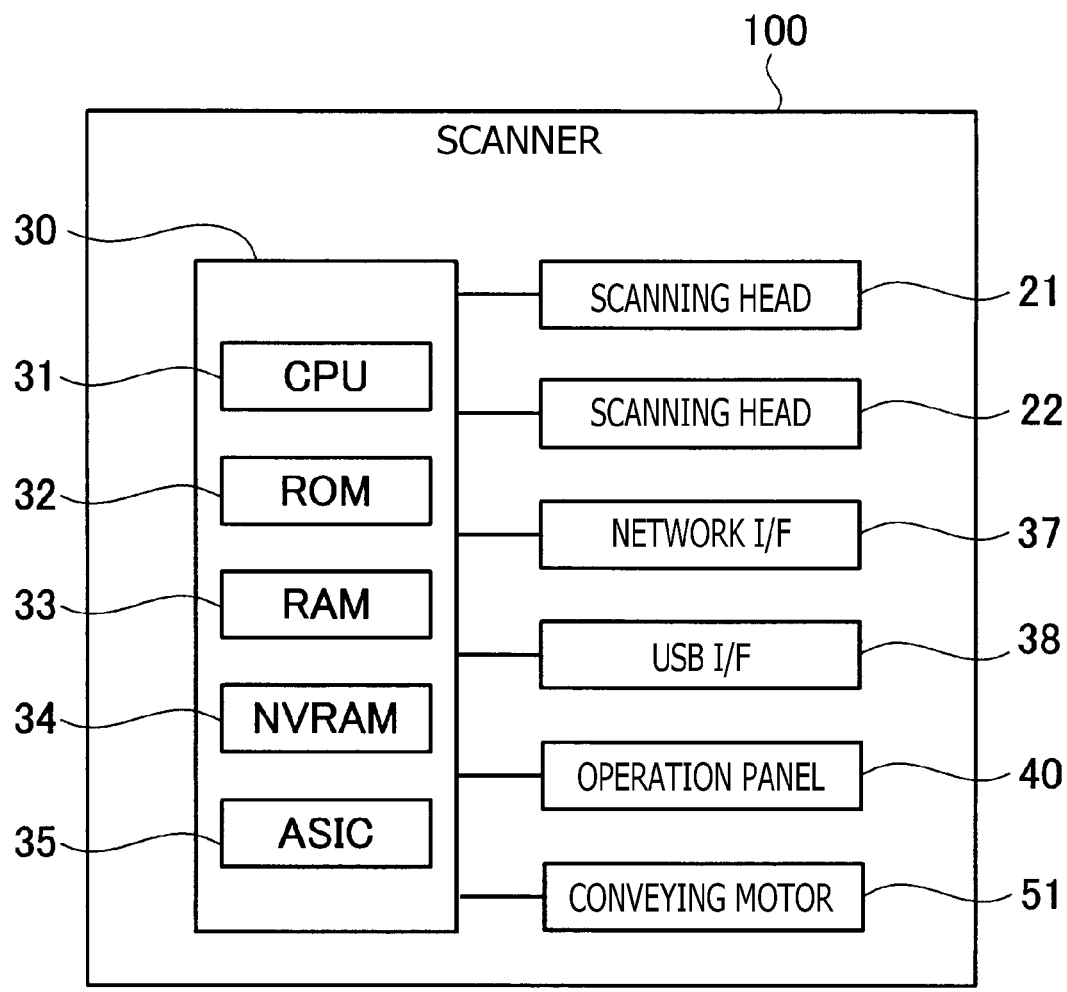
FIG. 5 is a block diagram showing an electrical configuration of the scanner according to the aspects of the disclosures.

Next, an electrical configuration of the scanner 100 will be described. As shown in FIG. 5, the scanner 100 has a controller 30 which includes a CPU (central processing unit) 31, a ROM (read only memory) 32, a RAM (random access memory) 33, an NVRAM (non-volatile RAM) 34, and an ASIC (application-specific integrated circuit) 35. Further, the scanner 100 has the scanning head 21, the scanning head 22, a network interface 37, USB (universal serial bus) interface 38, an operation panel 40, and the conveying motor 51, which are electrically connected to the controller 30.

The ROM 32 stores various control programs, various settings, initial values and the like for controlling the operations of the scanner 100. The RAM 33 is used for a work area when the various control programs are retrieved from the ROM 32 and/or a storage area for temporarily storing data. The controller 30 controls respective components of the scanner 100 in accordance with the control program retrieved from the ROM 32 with storing result of processes in the RAM 33 or the NVRAM 34.

It is noted that the term "controller" in FIG. 5 is used as a general term including the CPU 31 and hardware used for controlling the scanner 100 and is not intended to represent a single hardware component in the scanner 100.

The network interface 37 is hardware used to communicate with an external device to which the scanner 100 is connected through a network using a LAN (local area network) cable or the like. The USB interface 38 is hardware used to communicate a device to which the scanner 100 is connected through a USB cable or the like. The operation panel 40 is hardware which is configured to display various types of information for the user, and to acquire instructions which are input by the user.

Next, the one-sheet scanning job, which is performed by the scanner 100, will be described. When the one-sheet scanning job instruction is received, the scanner 100 operates to convey one original sheet and scan the same. According to the illustrative embodiment, as described above, after one original sheet is fed from the original sheet tray 28, if there exists another original sheet in the original sheet tray 28, the remaining original sheet is also fed when the previously fed sheet is being conveyed. That is, regardless of the scanning instruction, the original sheet for which the scanning instruction is received is followed by the next original sheet, which is also fed toward the conveying path with the predetermined sheet distance formed with respect to the previous original sheet.

Because of such a configuration, according to the illustrative embodiment, the current original sheet G1 subject to the scanning instruction might be fed when a previous original sheet G2 was fed, or together with an original sheet G3 which is the original sheet next to the current original sheet G1. That is, even though the current scanning instruction is the one-sheet scanning job, a plurality of original sheets may be conveyed. Further, according to the illustrative embodiment, depending on the relationship among a distance between the scanning heads 21 and 22, setting of the scanning area and the sheet distance, when scanning of the current original sheet G1, which is subject to the received one-sheet scanning job, has been completed, the leading end of the next original sheet G2 might have passed the scanning position 21P.

To avoid such a situation, according to the illustrative embodiment, a stoppage condition to stop the conveying operations when the one-sheet scanning job instruction is received when a plurality of original sheets are accommodated in the original sheet tray 28 is defined.

According to the illustrative embodiment, there are two different operations corresponding to two different stoppage conditions. A first operation is performed when the upstream scanning head 21 is unoccupied, which is a first stoppage condition. A second operation is performed when the downstream scanning head 22 is unoccupied, which is a second stoppage condition. For example, an administrative user may set one of the two stoppage conditions, and the scanner 100 operates one of the first and second operations. Alternatively, the scanner 100 may be configured, in advance, to perform one of the first and second operations.

The first operation is that the next original sheet G3 stops before it passes the scanning position. Accordingly, in the first operation, it is possible to suppress a state that a part of an image is missing, or scanning is started with inappropriate scanning setting. However, when the stoppage condition (i.e., the first stoppage condition) for the first operation is satisfied, scanning of the current original sheet G1 may not have been completed. That is, there is a possibility that scanning of the current original sheet G1 is completed after the scanning instruction for the next original sheet G2 is received.

The second operation is that feeding of the current original sheet G1 is stopped at a position where scanning of the current original sheet G1 is completed. Accordingly, when the second operation is performed, scanning of the current original sheet G1 for which the scanning instruction was received can be completed earlier. However, when the stoppage condition (i.e., the second stoppage condition) for the second operation is satisfied, the next original sheet G3 might exceed the scanning position. According to the illustrative embodiment, as will be described later, in scanning of the next original sheet G3 when the second operation is performed, there is little possibility that a part of an image is missing or inappropriate data is generated.

Hereinafter, the first operation will be described. As mentioned above, the stoppage condition for the first operation is that the upstream scanning head 21 is unoccupied. Specifically, the stoppage condition for the first operation is that there is no original sheet at the scanning position 21P and the scanning head 21 is not scanning an image. For example, when the one-sheet scanning instruction to scan the current original sheet G1 is received, the conveying operation of the original sheets is stopped before the next original sheet G3, which is conveyed after the current original sheet G1, reaches the scanning position 21P.

An example of stop position according to the first operation is illustrated in FIG. 6. FIG. 6 shows a stopped state after the one-sheet scanning job instruction for the preceding original sheet G2 is received, the scanning operation for the preceding original sheet G2 has been performed, and before the scanning instruction for the current original sheet G1 is received.

In the stopped state after the one-sheet scanning job instruction for the current original sheet G1 is received, as shown in FIG. 6 with parentheses, the current original sheet G1 is located on the downstream side, while the next original sheet G3 is located on the upstream side. It is noted that FIG. 6 only schematically shows a part of the conveying path 25.

In the stopped state according to the first operation, it is preferable that the stopped position of the original sheet on the upstream side is not so far from the scanning position 21P. In this example, the distance between the original sheet and the scanning position 21P is less than a predetermined distance. It is noted, however, if the scanning setting includes the over-scan setting, scanning of the original sheet starts at a position frontward of the leading end of the original sheet by the width W1. When the first operation is stopped, since the scanning instruction for the original sheet which is stopped on the upstream side has not been received, the scanning setting for the upstream side sheet is unknown. Therefore, in the first operation, as shown in FIG. 6, the upstream side original sheet is stopped when the leading end of the upstream side original sheet has reached the position A. The position A is, as described above, the upstream side position which is on the upstream side of the scanning position 21P by an amount which is equal to the maximum amount of the width W1.

As described above, in order to avoid overlap of the scanning areas between the two successively conveyed original sheets, the sheet distance, the widths W1 and W2 of the over-scan setting are appropriately set. Therefore, the trailing end of the downstream side original sheet in the stopped state as shown in FIG. 6 has passed at least the position B. The position B is the position on the downstream side with respect to the scanning position 21P by the width W2. That is, even though the scanning setting for the downstream side original sheet includes the over-scan setting, the scanning area of the original sheet has passed the scanning position 21P. That is, in such a case, the scanning by the scanning head 21 has been completed. Accordingly, this arrangement fulfills a condition that scanning head 21 is operating to scan, which is included in the first stoppage condition for the first operation.

Then, the scanner 100 receives the scanning instruction for the current original sheet G1 under a state where the previous original sheet G2 is located on the downstream side and the current original sheet G1 to be scanned is located on the upstream side in FIG. 6. When the scanning instruction for the current original sheet G1 is received, the scanner 100 starts the conveying operation of the original sheets G1 and G2, and scans the image on the current original sheet G1. If the scanning of the previous original sheet G2 has not been completed, scanning of the original sheet G2 is also performed. When the leading end of the next original sheet G3, which is conveyed after the current original sheet G1, has reached the position A, conveying of the original sheets is stopped.

When the conveying of the original sheets is stopped after the scanning instruction for the current original sheet G1 is received and the scanning operation is performed, for example, the scanned original sheet G1 is located on the downstream side, and the original sheet G3 to be scanned next is located on the upstream side. Then next scanning instruction will be the instruction to start scanning of the original sheet G3. It is noted that whether the original sheet is located at the downstream side scanning position 22P depends on the sheet distance, and the original sheets are not necessarily arranged as shown in FIG. 6. For example, the original sheets are stopped such that the trailing end of the downstream side original sheet G1 may be located on the downstream side position with respect to the scanning position 22P.

When the scanner 100 operates in accordance with the first operation, and if the scanning instruction of double-side scanning, both the scanning heads 21 and 22 are used for scanning the current original sheet G1. Accordingly, in such a case light amount adjustment of both the scanning heads 21 and 22 is executed. For example, when the original sheets are arranged as shown in FIG. 6, sine the upstream side scanning head 21 is unoccupied, the light amount adjustment of the scanning head 21 can be performed. At the scanning position 22P, the previous original sheet G2 is located and thus the scanning head 22 is not unoccupied, the light amount adjustment of the scanning head 22 is not performed in this state.

When the scanner 100 operates in accordance with the first operation and when the one-sheet scanning job instruction is received when the original sheets are arranged as shown in FIG. 6, the scanner 100 performs the light amount adjustment of the upstream scanning head 21. Then, after the conveying operation of the original sheets G1 and G2 is started, the scanner 100 determines whether the light amount adjustment of the downstream scanning head 22 is to be performed. When the downstream scanning head 22 becomes unoccupied, the scanner 100 determines the light amount adjustment is to be done, and performs the same. Further, when the stoppage condition is satisfied, conveying of the original sheets are stopped, thereby the one-sheet scanning job is terminated. It is noted that, when the scanning instruction for the current original sheet G1 is the one-side scanning, only the upstream scanning head 21 is used for scanning, there is no need to perform the light amount adjustment of the downstream scanning head 22.

Referring to a flowchart shown in FIG. 7, a first scanning process, in which the light amount adjustment and the scanning of the original sheets are performed, will be described. The first scanning process is executed by the controller 30 in response to receipt of the one-sheet scanning job for the current original sheet G1.

When the first scanning process is invoked, the scanner 100 (i.e., the controller 30) determines whether the current original sheet G1 is located at the position A (S101). The position of the original sheet can be detected based on the conveying amount of the original sheet after the leading end thereof is detected by the conveying sensor 62 or results of detection by the scanning heads 21 and 22. Thus, the scanner 100 is regarded to always grasp the positions of the original sheets being conveyed.

When the controller 30 determines that there is not the current original sheet G1 at the position A (S101: NO), the controller 30 drives the conveying motor 51 to start the conveying operation of the original sheets (S102). For example, with the feed roller 52, the original sheet accommodated in the original sheet tray 28 is fed toward the conveying path 25. It is noted that, according to the first operation, the original sheet is stopped when it has reached to the position A. Therefore, when it is determined that there is no original sheet at the position A, no other original sheet (e.g., the previous original sheet G2 as shown in FIG. 6) is left at the position A.

Next, the current controller 30 determines whether the leading end of the current original sheet G1 has reached the position A (S103). When it is determined that the leading end of the current original sheet G1 has not reached the position A (S103: NO), the controller 30 determines whether a predetermined standby time period has passed but the current original sheet G1 has not reached the position A after the conveyance of the original sheets were started (S104). If the controller 30 determines that the predetermined standby time period has not passed (S104: NO), the controller 30 returns to S102 and continues the sheet conveying operation.

When the controller 30 determines that the leading end of the current original sheet G1 has reached the position A (S103: YES), the controller 30 tentatively stops the sheet conveying operation (S105). When the current original sheet G1 does not reach the position A even though the predetermined standby time period has passed, the controller 30 determines that the timeout state is occurred (S104: YES), and terminates the first scanning process.

When the controller 30 determines that the current original sheet G1 is located at the position A when the first scanning process is invoked (S101: YES), the controller 30 determines whether the downstream scanning head 22 is unoccupied (S106) after the sheet conveying operation is stopped in S105. That is, the controller 30 determines whether the current status is that the previous original sheet G2 is not located at the scanning position 22P and the scanning head 22 is not scanning the original sheet.

Depending on whether the scanning setting for the previous original sheet G2 is the over-scan setting or not, the order of fulfillment of the condition where the previous original sheet G2 is not located at the scanning position 22P and the condition where the scanning head 22 is not performing the scanning is different. That is, when the scanning setting is not the over-scan setting, the scanning is completed first, and then the previous original sheet G2 passes. When the scanning setting is the over-scan setting, the previous original sheet G2 passes first, and thereafter, the scanning is completed. Regardless of the order of the two conditions, the controller 30 determines that the determination in S106 is YES when both the conditions are satisfied.

Depending on the status of the scanning head 22, the controller 30 executes one of three scanning start processes which will be described below. When the controller 30 determines that the downstream scanning head 22 is unoccupied (S106: YES), the controller 30 executes an upstream/downstream scanning start process (S107). When it is determined that the scanning head 22 is not unoccupied (S106: NO), the controller 30 determines whether scanning of the previous original sheet G2 has been completed (S109). When it is determined that the scanning of the original sheet G2 has been completed (S109: YES), the controller 30 executes a sequential scanning start process (S111). When it is determined that the scanning of the original sheet G2 has not been completed (S109: NO), the controller 30 executes a parallel scanning start process (S113).

Next, referring to a flowchart shown in FIG. 8, the upstream/downstream scanning start process will be described. As described above, the upstream/downstream scanning start process is executed when the downstream scanning head 22 is unoccupied and the current original sheet G1 is located at the position A.

When the upstream/downstream scanning start process is invoked, the controller 30 determines whether the scanning instruction for the current original sheet G1 is the one-side scanning instruction (S201). When the one-side scanning is performed, only the upstream scanning head 21 is used for scanning. Accordingly, when the scanning instruction is the one-side scanning instruction (S201: YES), the controller 30 performs the light amount adjustment only for the upstream scanning head 21 in accordance with the scanning setting for the current original sheet G1 (S202). Then, controller 30 starts conveying the current original sheet G1 (S203), starts scanning the current original sheet G1 with the scanning head 21 (S204) and terminates the upstream/downstream scanning start process.

When the controller 30 determines that the scanning instruction is the both-side scanning instruction (S201: NO), the controller 30 performs the light amount adjustment for both the upstream scanning head 21 and the downstream scanning head 22, in parallel, in accordance with the scanning setting for the current original sheet G1 (S206). Then, the controller 30 starts conveying the original sheet (S207), and starts scanning one side of the current original sheet G1 with the upstream scanning head 21 (S208).

Next, the controller 30 determines whether the leading end of the scanning area of the other side of the current original sheet G1 has reached the scanning position 22P of the downstream scanning head 22 (S210). When it is determined that the leading end of the scanning area of the current original sheet G1 has not reached the scanning position 22P (S210: NO), the controller 30 continues scanning the one surface of the current original sheet G1 and the conveying the current original sheet G1 until the leading end of the scanning area of the current original sheet G1 reaches the scanning position 22P. When the controller 30 determines that the leading end of the scanning area of the current original sheet G1 has reached the scanning position 22P (S210: YES), the controller 30 starts scanning of the other side of the current original sheet G1 with the scanning head 22 (S211), and terminates the upstream/downstream scanning start process. It is noted that, depending on a positional relationship between the scanning areas of the one side and the other side of the current original sheet G1, the scanning start timing at S208 of the one side of the current original sheet G1 may be later than the scanning start timing of the other side of the current original sheet G1 at S211. It is noted that the upstream/downstream scanning start process is terminated after the scanning operations of both sides of the current original sheet G1 have been started.

Next, the sequential scanning start process executed in S111 of FIG. 7 will be described, referring to a flowchart shown in FIG. 9. It is noted that the sequential scanning start process is executed when the scanning of the original sheet G2 has been completed but the original sheet G2 remains at the scanning position 22P of the downstream scanning head 22. In FIG. 9, steps similar to those in FIG. 8 are assigned with the same step numbers and description thereof is omitted for brevity.

In the sequential scanning start process, firstly the controller 30 performs the light amount adjustment for the upstream scanning head 21 (S202). In S202, the controller 30 starts conveying the original sheet, and starts scanning the current original sheet G1 with the scanning head 21 (S204). Next, the controller 30 determines whether the scanning instruction is the one-side scanning (S301). When it is determined that the scanning instruction is the one-side scanning instruction (S301: YES), the controller 30 terminates the sequential scanning start process. When the one-side scanning is performed, the process is substantially the same as in the upstream/downstream scanning start process.

When the scanning instruction is the both-side scanning instruction (S301: NO), the controller 30 determines whether the downstream scanning head 22 becomes unoccupied (S302). Since the conveying of the original sheet was started in S203, the previous original sheet G2, which remained at the scanning position 22P when the sequential scanning start process was started, is conveyed as the current original sheet G1 is conveyed. Therefore, the original sheet G2 will be conveyed and the scanning head 22 will become unoccupied as time elapses. That is, when it is determined that the previous original sheet G2 remained at the scanning position 22P (S302: NO), the controller 30 continues conveying the original sheet and awaits that the scanning head 22 becomes unoccupied.

When it is determined that the scanning head 22 becomes unoccupied (S302: YES), the controller 30 tentatively stops conveying the original sheet (S303). Then, the controller 30 performs the light amount adjustment of the downstream scanning head 22 (S304).

When the light amount adjustment is completed, the controller 30 restarts conveying the original sheet (S305). When it is determined that the leading end of the scanning area of the other side of the current original sheet G1 has reached the scanning position 22P of the downstream scanning head 22, the controller 30 starts scanning the other side of the current original sheet G1 with the scanning head 22 (S306), and terminates the sequential scanning start process. It is noted that, if the light amount adjustment can be performed without stopping the original sheet, steps S303 and S305 could be skipped.

Next, the parallel scanning start process, which is executed in S113 of FIG. 7, will be described, referring to a flowchart shown in FIG. 10. It is noted that the parallel scanning start process is executed when the scanning of the previous original sheet G2 has not be completed. It is noted that steps in FIG. 10 which are similar to those in FIG. 8 are assigned with the same step numbers and description thereof is omitted for brevity.

In the parallel scanning start process, firstly the scanning setting for the current original sheet G1 and the scanning setting for the previous original sheet G2 are compared (S401). Then, based on the result of comparison in S401, the light amount adjustment for the upstream scanning head 21 is performed (S402).

According to the illustrative embodiment, depending on the result of comparison in S401, a method of the light amount adjustment in S402 is different. For example, when the scanning setting for the current original sheet G1 is the same as that for the previous original sheet G2, the light amount adjustment is performed based on the common scanning setting. When the scanning setting for the current original sheet G1 and the scanning setting for the previous original sheet G2 are different, the light amount adjustment is performed based on a higher setting of the two settings. It is noted that the "higher setting" is, for example, the setting for a higher resolution. For another example, a color image scanning is "higher setting" than a monochromatic image scanning.

In S402, when the scanning setting for the current original sheet G1 is the "higher setting" than the scanning setting for the previous original sheet G2, the controller 30 performs the light amount adjustment based on the scanning setting for the current original sheet G1. When the scanning setting for the current original sheet G1 is the "lower setting" than the scanning setting for the previous original sheet G2, the controller 30 performs two types of the light amount adjustments respectively based on the scanning setting for the current original sheet G1 and the light amount adjustment based on the scanning setting for the previous original sheet G2.

Then, the controller 30 starts the sheet conveying operation based on a slower one of the conveying speed based on the scanning setting for the current original sheet G1 and the conveying speed based on the scanning speed for the previous original sheet G2 (S404). Further, the controller 30 starts the scanning operation based on the resolution which is the higher one of the resolution based on the scanning setting for the current original sheet G1 and the resolution based on the scanning setting for the previous original sheet G2 with the scanning heads 21 and 22 (S405). It is noted that the current original sheet G1 is scanned with the scanning head 21, and the previous original sheet G2 is scanned with the scanning head 22. It is noted that light amount adjustment for the scanning head 22 has been performed when the scanning instruction for the previous original sheet G2 was received. Accordingly, the scanning with the scanning head 22 is performed with use of the result of the previously performed light amount adjustment.

Then, the controller 30 determines whether scanning of the previous original sheet G2 has been completed (S407). When it is determined that the scanning has not been completed (S407: NO), the controller 30 continues conveying of the original sheet and scanning thereof until the scanning of the previous original sheet G2 is completed. When it is determined that the scanning has been completed (S407: YES), the controller 30 generates the scan data of the previous original sheet G2 (S408). That is, the controller 30 combines portion of data corresponding to a portion of the current original sheet G1 having been scanned before the scanning instruction for the current original sheet G1 was received, and portion or data corresponding to a portion of the current original sheet G1 which has been scanned after the scanning instruction of the current original sheet G1 was received to generate one piece of scan data of the current original sheet G1. It is noted that the portion of data corresponding to the portion of the current original sheet G1 having been scanned before the scanning instruction was received was stored when the previous original sheet G2 was scanned.

It is noted that when it is determined that the scanning has not been completed (S407: NO), the scanning with the downstream scanning head 22 is tentatively stopped. It is also noted that, S407 may be executed at any arbitrary timing before the first scanning process is terminated if decision at S407 becomes "YES." Further, if the scanning setting of the current original sheet G1 and the scanning setting of the previous original sheet G2 are different, and the scanning of the previous original sheet G2 is performed in accordance with the scanning setting of the current original sheet G1 in S405, the controller 30 converts the portions scanned in accordance with the parallel scanning start process (S408) in accordance with the scanning setting of the previous original sheet G2, and then combines the converted portion data to generate a single piece of scan data.

Then, the controller 30 continues to convey the original sheet and scanning of the current original sheet G1 with the scanning head 21 (S410). It is noted that, even though the scanning setting of the previous original sheet G2 in S404 and S405, the scanning setting of the current original sheet G1 is used in S410 or later steps.

Next, the controller 30 determines whether the scanning setting of the current original sheet G1 includes the single-side scanning (S301). When the scanning setting includes the single-side scanning (S301: YES), the controller 30 terminates the parallel scanning start process.

When the scanning setting does not include the single-side scanning (i.e., the double-side scanning) (S301: NO), the controller 30 keeps conveying the original sheet. Thereafter, when it is determined that the scanning head 22 becomes unoccupied (S302: YES), the controller 30 tentatively stops conveying the original sheet (S303). Then, the controller 30 performs the light amount adjustment of the downstream scanning head 22 in accordance with the scanning setting of the current original sheet G1 (S304). When the light amount adjustment has been completed, the controller 30 restarts conveying the original sheet (S305). Then, the scanning of the other side of the current original sheet G1 with the downstream scanning head 22 (S306), and terminates the parallel scanning start process.

Since the upstream/downstream scanning start process (FIG. 7, S107), the sequential scanning start process (FIG. 7, S111) or the parallel scanning start process (FIG. 7, S113) has been completed, the scanner 100 has already started scanning of the current original sheet G1. Accordingly, in FIG. 7, the controller 30 determines whether the next original sheet G3 has reached the position A (S115). When the next original sheet G3 has not reached the position A (S115: NO), the controller 30 continues conveying and scanning the original sheets, and determines whether the current original sheet G1 is discharged (S117).

When the current original sheet G1 has not been discharged (S117: NO), the controller 30 continues conveying and scanning of the original sheets. Then, when the next original sheet G3 has reached the position A (S115: YES) or the current original sheet G1 has been discharged (S117: YES), the controller 30 stops conveying the original sheets (S119). It is noted that the controller 30 also stops scanning when the current original sheet G1 is being scanned when the controller 30 executes S119.

Then, the controller 30 determines whether scanning of the current original sheet G1 has been completed (S120). When it is determined that the scanning has been completed (S120: YES), the controller 30 generates scan data based on the scanned image (S121), and terminates the first scanning process. As mentioned above, when scanning of the previous original sheet G2 has not been completed when the first scanning process is started, and the scanning resolution for the previous original sheet G2 is higher than that for the current original sheet G1, the scanning is performed at the scanning resolution of G2 until the scanning of the previous original sheet G2 is completed. In such a case, in S121, the controller 30 converts the data obtained by scanning the current original sheet G1 at the scanning resolution different from that of the scanning setting to data corresponding to the scanning resolution of the scanning setting for the current original sheet G1, and combines the same with data of the remaining portion of the current original sheet G1 to generate the scan data for the current original sheet G1.

When it is determined that the scanning has not been completed (S120: YES), the controller 30 stores the scanning setting for the current original sheet G1 and data of currently scanning image in the NVRAM 34 (S122) and terminates the first scanning process. In this case, as mentioned above, the first scanning process is terminated without completing the scanning of the current original sheet G1. The scanning of the current original sheet G1 is completed after the scanning instruction for the next original sheet G2 is received.

Next, a second operation of the scanner 100 will be described. FIG. 11 shows a stop position in the second operation. A stop condition for the second operation is that the downstream head 21 is unoccupied. According to the illustrative embodiment, the stop condition is that there is no original sheet at the scanning position 22P and the scanning head 22 is not scanning an image. For example, scanning of the current original sheet G1 has been completed and the trailing end of the current original sheet G1 has passed the scanning position 22P of the downstream scanning head 22, the sheet conveying operation is stopped. Alternatively, the stop condition may be defined such that the trailing end of the current original sheet G1 has reached a position D which is a position on downstream side, by the width W2, with respect to the scanning position 22P of the downstream scanning head 22. It is noted that, when the trailing end of the original sheet has reached the position D, the scanning of the original sheet has been completed regardless of the scanning setting.

When the scanner 100 executes the second operation, as shown in FIG. 11 for example, the original sheet G2 is stopped with its trailing end located at the position D, and the scanning instruction for the current original sheet G11 is received in this arrangement. As mentioned above, the sheet distance, and the widths for the over-scan W1 and W2 are set so that the scanning areas of the two continuous original sheets do not overlap, in die stopped state show in FIG. 11, the leading end of the current original sheet G1 has not yet reached the position C which is on upstream side, by the width W2, with respect to the scanning position 22P of the scanning head 22. It is noted, however, the leading end of the scanning area of the front surface of the current original sheet G1 may have been passed the scanning position 21P of the scanning head 21.

When the scanner 100 receives the scanning instruction for the current original sheet G1 in the state shown in FIG. 11, the scanner 100 starts conveying the original sheets G1 and G2, and starts scanning the current original sheet G1. When the trailing end of the current original sheet G1 has reached the position D, the controller 30 stops the scanning operation. When the scanning operation is stopped after the controller 30 receives the scanning instruction for the current original sheet G1 and the scanning operation was performed, for example, the current original sheet G1 is located on the downstream side in FIG. 1, and the next original sheet G3 is located on the upstream side in FIG. 11. In such a state, the controller 30 will receive the instruction to start scanning the next original sheet G3. It is noted that whether an original sheet is located at the position of the upstream scanning head 21 depends on the sheet distance, and the arrangement of the sheets may be different from the state shown in FIG. 11. For example, the leading end of the next original sheet G3, which is arranged on the upstream side, may stop at a position on the upstream side with respect to the scanning position 21P.

When the scanner 100 performing the second operation receives the both-side scanning instruction, both the scanning heads 21 and 22 are used for scanning the current original sheet G1. Accordingly, the light amount adjustment should be performed for both the scanning heads 21 and 22. For example, in the arrangement shown in FIG. 11, the light amount adjustment for the downstream scanning head 22 can be performed as it is unoccupied. However, the leading end of the original sheet has already passed the scanning position 22P of the upstream scanning head 21.

Therefore, when the scanner 100 performing the second operation receives the both-side scanning instruction of the one-sheet scanning job in the arrangement shown in FIG. 11, the controller 30 firstly performs the light amount adjustment of the downstream scanning head 22. Next, after the controller 30 starts conveying the original sheets G1 and G2, the controller 30 determines whether the light amount adjustment of the upstream scanning head 21 it to be performed. Then, when the upstream scanning head 21 becomes unoccupied, the controller 30 determines that the light amount adjustment of the upstream scanning head 21 it to be performed, and performs the same. Further, when the stop condition is satisfied, the controller 30 stops conveying the original sheets. Thus, in this case, the order of the light amount adjustment of the scanning heads 21 and 22 is reversed in comparison with the case when the first operation is performed. It is noted that, when the scanning instruction for the current original sheet G1 is the single-side scanning, it is unnecessary to perform the light amount adjustment of the downstream scanning head 22.

Next, the second scanning process in which the scanner 100 performing the second operation executes the light amount adjustment and scanning of the original sheet will be described referring to a flowchart shown in FIG. 12. The second scanning process is invoked by the controller 30 when the scanner 100, which is performing the second operation, receives the scanning instruction of the single sheet scanning job for scanning the current original sheet G1. In FIG. 12, the steps similar to those in the first scanning process of the first operation are assigned with the same step numbers and description thereof is omitted for brevity.

The scanner 100 firstly determines whether the current original sheet G1 has reached at least the position A (S501). For example, when the current original sheet G1 has passed the position A as shown in FIG. 11, the determination in S501 is "YES." When the controller 30 determines that the current original sheet G1 has not yet reached the position A (S501: NO), the controller 30 starts conveying the original sheets (S102). It is noted that, in the second operation, scanning of the previous original sheet G2 has been completed, it is unnecessary to take the position of the previous original sheet G2 into account when the controller 30 starts conveying the original sheets.

Next, the controller 30 determines whether the current original sheet G31 has reached the position A (S103). When the controller 30 determines that the current original sheet G1 has not reached the position A (S103: NO), the controller 30 determines whether it is a timeout state (S104). When the controller 30 determines that it is not the timeout state (S104: NO), the controller 30 returns to S102 and continues conveying the original sheets. When the current original sheet G1 does not reach the position A after a predetermined standby period has elapsed, the controller 30 determines that the timeout state has occurred (S104: YES), and terminates the second scanning process.

When the controller 30 determines that the current original sheet G1 has reached the position A (S103: YES), the controller 30 tentatively stops conveying the original sheets (S105) and executes the upstream/downstream scanning start process (S107). The upstream/downstream scanning start process is started when the downstream scanning head 22 is unoccupied and the current original sheet G1 is located at the position A. The upstream/downstream scanning start process is the same process described referring to FIG. 8 when the scanner 100 executes the first operation.

When it is determined that the current original sheet G11 has reached at least the position A (S501: YES) at the beginning of the second scanning process, the continuous scanning start process is executed (S507).

Next, the continuous scanning start process which is executed in S507 of FIG. 12 will be described referring to a flowchart shown in FIG. 13. The continuous scanning start process is executed, for example, when the current original sheet G1 has reached at least the position A, and the previous original sheet G2 is located at the position D.

In the second operation, as shown in FIG. 11, there could be a case where the leading end of the current original sheet G1 has passed the scanning position 21P of the upstream scanning head 21 when the sheets are stopped. In such a case, scanning of the current original sheet G1 should have been included in a series of operation to be started in response to receipt of the scanning instruction for the previous original sheet G2. Therefore, the scanner 100 should have started the scanning of the current original sheet G1, in accordance with the scanning instruction for the previous original sheet G2, without identifying the scanning setting of the current original sheet G1. Further, in response to receipt of the scanning instruction for the current original sheet G1, scanning of the next original sheet G3 should have been started without identifying the scanning setting for the next original sheet G3. Such a scanning operation to be executed before receipt of the scanning instruction will be described below.

When the scanning is started before the scanning instruction is received, the scanner 100 performs the light amount adjustment of the scanning head 21 when the current original sheet G1 has reached the position A, before the scanning is started. When the light amount adjustment is performed before the scanning instruction is received, the scanner 100 performs the light amount adjustment operations corresponding to various types of settings, and stores the results of the light amount adjustment operations, respectively. The light amount adjustment operations performed before receipt of the scanning instruction will be described in detail later.

When the scanner 100 invokes the continuous scanning start process, results of the light amount adjustment operations for the scanning head 21, which were performed during scanning of the previous original sheet G2, are applied in accordance with the scanning setting for the current original sheet G1. That is, since the scanner 100 has stored the results of the light amount adjustment operations corresponding to the various types of scanning settings, the scanner 100 can select a result suitable to the received scanning setting for the current original sheet G1 therefrom and use the same when the continuous scanning start process is started.

Next, the controller 30 determines whether scanning of the current original sheet G1 has been started (S602). When it is determined that the scanning of the current original sheet G1 has already been started (S602: YES), the controller 30 converts, depending on necessity, the data of the scanned portion, which has already been stored (S603). When it is determined that the scanning has not been started (S602: NO), the controller 30 skips S603.

When the scanning of the current original sheet G1 was started when the previous original sheet G2 was being scanned, the scanner 100 stores data of a scanned portion of the current original sheet G1 when the scanning of the previous original sheet G2 was completed. Accordingly, in S603, the scanner 100 converts the data of the scanned portion of the current original sheet G1, if necessary, to meet the scanning setting received this time. It is noted that the process of S603 may be executed at any timing after the determination in S602 is "YES" and before the completion of the second scanning process.

Next, the controller 30 determines whether the scanning setting for the current original sheet G1 is the single-side scanning (S605). When it is determined that the scanning setting is the single-side scanning (S605: YES), the controller 30 starts conveying the original sheets (S607) and starts scanning the current original sheet G1 with the upstream scanning head 21 (S608). Then, the controller 30 terminates the continuous scanning start process. It is noted that, when the scanning of the current original sheet G1 has been started during the previous scanning operation, a portion of the current original sheet G1 for which the scanning is started at S608 is the remaining portion of the original sheet.

When the scanning setting for the current original sheet G1 is not the single-side scanning (S605: NO), the controller 30 performs the light amount adjustment of the downstream head 22 (S610). When the second scanning operation is started, as mentioned above, the scanning head 22 is unoccupied. Accordingly, the light amount adjustment of the scanning head 22 can be performed immediately. It is noted that, in S610, only the light adjustment corresponding to the scanning setting for the current original sheet G1 is performed.

Then, the controller 30 starts conveying the original sheets (S611), and starts scanning the current original sheet G1 with the scanning head 21 (S612). It is noted that the portion of the current original sheet G1 subjected to the scanning in S612 may be the remaining portion of the previous scanning operation as in S608.

By continuing the conveyance of the original sheets and the scanning with the scanning head 21, the controller 30 determines whether the leading end of the scanning area of the back surface of the current original sheet G1 has reached the scanning position 22P of the downstream scanning head 22 (S6141. When the leading end of the scanning area of the back surface of the current original sheet G1 has not reached the scanning position 22P of the scanning head 22 (S614: NO), the controller 30 keeps conveying and scanning the front surface of the scanning sheet. When it is determined that the leading end of the scanning area of the back surface of the current original sheet G1 has reached the scanning position 22P (S614: YES), the controller 30 starts scanning with the downstream scanning head 22 (S615), and terminates the continuous scanning start process.

When the upstream/downstream scanning start process (S107) or the continuous scanning start process (S507) has been completed, the controller 30 determines whether the leading end of the next original sheet G3 has reached the position A (S509). When the leading end of the next original sheet G3 has not reached the position A (S509: NO), the controller 30 keeps executing the conveying and scanning operations, and determines whether the trailing end of the current original sheet G1 has reached the position D (S511). When the trailing end of the current original sheet G1 has not reached the position D (D511: NO), the controller 30 keeps the conveying and scanning operations until the next original sheet G3 reaches the position A or the current original sheet G1 reaches the position D. It is noted that, when the scanning of the scanning area has completed, the controller 30 only keeps conveying the original sheets.

When the controller 30 determines that the next original sheet G3 has reached the position A (S509: YES), the controller 30 executes the next sheet scanning process (S517). The next sheet scanning process is a process including the light amount adjustment of the upstream scanning head 21.

Next, the next sheet scanning process executed in S513 of FIG. 12 will be described referring to a flowchart shown in FIG. 14. In the next sheet scanning process, firstly, the controller 30 stops conveying the original sheets (S701). It is noted that the position of the leading end of the next original sheet G3 when the next sheet scanning process is started is the scanning start position when the scanning setting of the next original sheet (3 is the over-scan setting. Therefore, when the next sheet scanning process is performed, the controller 30 tentatively stops conveying the original sheets and performs the light amount adjustment of the upstream head 21 before the sheets are conveyed further.

The light amount adjustment in S702 should be performed, under an ordinary circumstance, to meet the scanning setting for the next original sheet G3. However, at this stage the process, the scanning setting for the next original sheet G3 is unknown, the scanner 100 performs the light amount adjustment for all the types of the scanning settings, and stores the results of the light amount adjustment in the NVRAM 34 in association with the respective scanning settings. With this configuration, as is done in S601 for the current original sheet G1, after the scanning instruction for the next original sheet G3 is received and the scanning setting is determined, the light amount adjustment result meeting the determines scanning setting can be applied.

In S704, it is determined whether the scanning of the current original sheet G1 has been completed. When it is determined that the scanning of the current original sheet G1 has not been completed (S704: NO), the CPU 13 restarts the conveying of the original sheets, and performs the scanning operation with the upstream scanning head 21 and the downstream scanning head 22, respectively (S705). That is, with use of the downstream scanning head 22, the scanning of the current original sheet G1 is continued, while with use of the upstream scanning head 21, the scanning of the next original sheet G3 is started. Thus, scanning of the current original sheet G1 is continued with use of the downstream scanning head, while conveying and scanning of the next original sheet G3 is with use of the upstream scanning head 21 is started.

Since the scanning setting for the next original sheet G3 is unknown at this stage, the controller 30 executes the scanning with use of the scanning head 21 in accordance with the scanning setting for the best image quality. According to the illustrative embodiment, the best image quality corresponds scanning of a color image at the highest resolution. It is noted that, converting image data at a higher image quality can be converted into one at a lower image quality relatively easily. However, the opposite is not so easy. That is, it is difficult to convert image data at the low resolution to image data at higher resolution. Therefore, in the scanning operation in S705, the data for the highest image quality, from among the light amount adjustment data obtained in S702, is applied.

As described above, depending on the scanning setting, the conveying speed may be different. Further, throughout the conveying path 25, the conveying speed is constant. Because of this configuration, since the next original sheet G3 is scanned at the scanning setting for the highest image quality, in S705, the current original sheet G1, of which the scanning setting has been known, is to be scanned at the scanning setting for the highest image quality. It is noted that, if the scanning at the scanning setting for the current original sheet G1 is possible even though the conveying speed is for the highest image quality, the scanning with the scanning head 22 in S705 may be performed at the scanning setting for the current original sheet G1.

When the scanning of the current original sheet G1 has been completed (S704: YES), the controller 30 generates the scan data of the current original sheet G1 (S707). For example, when the scanning of the current original sheet G1 is performed at the scanning setting other than that for the current original sheet G1 in S705, the controller 30 converts the data for that portion, and then combines the converted data with data for remaining portions, thereby generating the complete scan data. It is noted that the process at S707 may be executed at any timing after determination in S704 is "YES" and before the second scanning process is terminated. That is, for example, steps S709 onwards may be executed before S707.

Next, the controller 30 determines whether the trailing end of the original sheet has reached the position D (S709). When it is determined that the trailing end has not reached the position D (S709: NO), the controller 30 continues conveying and scanning of the next original sheet G3 (S710). That is, the controller 30 conveys the original sheets ate the conveying speed corresponding to the highest image quality, and scans the next original sheet G3 with the scanning head 21. It is noted that the step S710 is a process to continue conveying of the original sheet if the conveying of the original sheet has started in S705, and a process to start conveying the original sheet if the conveying of the original sheet has not be started.

Then, when it is determined that the trailing end of the current original sheet G1 has reached the position D (S709: YES), the controller 30 stops conveying the original sheet (S712). As the conveying of the original sheet is stopped, the scanning operation is also stopped.

Next, the results of the various light amount adjustment operations executed in S702 and the data of the next original sheet G3 currently being scanned in the NVRAM 34 (S714), and the controller 30 terminates the next sheet scanning process. It is noted that, when the scanning of the next original sheet G3 has not been started, information indicating that the scanning has not be started is stored in S705, or S710.

When the next sheet scanning process (S513) is completed, the second scanning process is terminated. When the trailing end of the current original sheet G1 has reached the position D before the next original sheet G3 reaches the position A (S511: YES), the controller 30 stops conveying the original sheets (S513). It is noted that, when the trailing end of the current original sheet G1 has reached the position D, scanning of the current original sheet G1 has already been completed. Therefore, in such a case, the scan data of the current original sheet G1 is generated and the second scanning process is terminated. In this case, the scanning of the next original sheet G3 has not been started.

As described in detail above, the scanner 100 according to the illustrative embodiment has two scanning heads 21 and 22, with which the original sheet conveyed along the conveying path 25 is scanned at respective scanning positions 21P and 22P, when the scanning instruction is received, the scanner 100 performs the light amount adjustment of at least one of the scanning heads 21 and 22. Thereafter, the scanner 100 starts conveying and scanning of the original sheet. Further, when the conveying and scanning of the original sheet are started. Further, after the conveying of the original sheets is started, it is determined whether the other one of the scanning heads 21 and 22 is to be executed, and execute the same if it determined to be. Furthermore, the conveying of the original sheets is stopped when it is detected that there is no original sheet at least at one of the scanning positions 21P and 22P. Therefore, when the original sheet is not located at the scanning position 21P or 22P, the light amount adjustment is performed. Accordingly, a preparation operation of each of the scanning heads 21 and 22 can be performed appropriately.

It is noted that the configuration of the above-described illustrative embodiment shows only an example, which is not intended to limit the scope of the invention. That is, the above-described illustrative embodiment can be modified in various ways without departing from the scope of the invention. For example, the above-describe configuration may be applied not only to the scanner, but can be applied to any apparatus having an image scanning function, and such an apparatus may include a copier, a facsimile machine, a multi-function peripheral and the like.

The configuration of the conveying unit needs not be limited to the configuration of the above-described embodiment. For example, one or more additional conveying roller pairs may be provided to the conveying unit. Further, the image scanning apparatus may be configured such that operations of a plurality of roller pairs may be controlled independently.

It is noted that the over-scan setting may not be used. Further, the widths W1 and W2 for the over-scan setting may be input by the user. In such a case, the stop positions of the original sheets may be adjusted in accordance with the widths W1 and W2.

In the illustrative embodiment, the operation of the image scanning apparatus is described when the single-scan job is executed. It is noted that the light amount adjustment can be performed, between pages, during a continuous-scan job is performed.

For example, in the first operation, when the scanning of the current original sheet G1 is terminated before the leading end of the next original sheet G3 reaches the position A, and further, the trailing end of the current original sheet G1 has passed the scanning position 22P of the downstream scanning head 22, conveying of the original sheets may be stopped. Such a stoppage of the conveying operation may be incorporated in the stop condition.

In the second process, according to the above-described illustrative embodiment, before the scanning of the original sheet G3, the light amount adjustments of the upstream scanning head 21 executed for all the scanning settings. However, it is only an example, and the light amount adjustments for not all but a plurality of scanning settings may be sufficient. If the light amount adjustment operations for a plurality of scanning settings are executed, it is likely that one of the plurality of scanning settings meet the scanning setting for the next original sheet G3. Of course, it is preferable that the light amount adjustments are executed for all the scanning settings, since one of the results should meet the scanning setting of the next plurality of sheets.

In the second operation, the scanning of the next original sheet G3 is performed at the scanning setting for the highest quality. However, it is only an example, and the operation may be modified such that the scanning of the next original sheet G3 may be performed at the same scanning setting for the current original sheet G1.

According to the illustrative embodiment, whether the scanning has been completed or not is determined based on whether the scanning area of the original sheet has passed the scanning position. However, this configuration may be changed. Further, change of the scanning area based on the skew amount of the conveyed sheet or the sheet distance may not be employed.

In the illustrative embodiment, the scanner is configured such that, when the single-side scanning is performed, the upstream scanning head 21 is used. It is noted that the aspects of the invention may be applied to a scanner configured to use the downstream scanning head when the single-side scanning is performed. In such a scanner, when the scanning instruction of the single-side scanning is received, the light amount adjustment of only the downstream side scanning head may be performed. For example, in steps S202 and S204, the downstream scanning head 22 may be controlled instead of the upstream scanning head 21. Further, in the first process, the scanning of the current original sheet G1 may not be started until the downstream scanning head 22 becomes unoccupied, and after the light amount adjustment of the downstream scanning head 22 is performed, the scanning operation may be started. In the second operation, data of a portion scanned by the upstream scanning head 21 may be discarded, and only the downstream scanning head is used for the scanning. It is noted, however, the light amount adjustment of the upstream scanning head 21 for the next original sheet G3 should be performed.

What is claimed is:

1. An image scanning apparatus, comprising:
   a conveyer configured to convey an original sheet;
   a first scanning device configured to scan an image on one surface of the original sheet conveyed by the conveyer at a first scanning position;
   a second scanning device configured to scan an image on another surface of the original sheet conveyed by the conveyer at a second scanning position; and
   a controller in operable communication with the conveyor, the first scanning device and the second scanning device,
   the controller is configured to execute programmed instructions stored in a non-volatile memory accessible by the controller, the execution of the programmed instructions causing the controller to perform:
      a first adjustment process to execute when the original sheet is not at the first scanning position, in response to receipt of a scanning instruction, a light amount adjustment of the first scanning device before starting of scanning of the original sheet subject to the received scanning instruction;
      a starting process to start conveying and scanning of the original sheet after executing the first adjustment process;
      a determination process to determine, after starting conveying the original sheet by executing the starting process, whether the scanning of a previous original sheet has been completed and whether a trailing end of the previous original sheet has passed the second scanning position, and, if yes, to start a light amount adjustment of the second scanning device;
      a second adjustment process to execute when the original sheet is not in the second scanning position, and when it is determined, in the determination process, to start the light adjustment of the second scanning device, the light adjustment of the second scanning device; and
      a stoppage process to stop conveying the original sheet such that the original sheet is not stopped at the first scanning position.

2. The image scanning apparatus according to claim 1,
   wherein the execution of the programmed instructions further cause the controller to:
      stop conveying the original sheet under the state where there is no original sheet at the second scanning position and execute the second adjustment process when it is determined in the determination process that the light adjustment of the second scanning device is to be performed; and
      restart conveying the original sheet after the second adjustment process has been completed.

3. The image scanning apparatus according to claim 1,
   wherein the first scanning device is arranged on an upstream side, in a sheet conveying direction, with respect to the second scanning device, and
   wherein the controller is further configured to stop conveying the original sheet before a next sheet reaches the first scanning position in the stopping process.

4. The image scanning apparatus according to claim 3,
   wherein the controller is configured to execute programmed instructions further causing the controller to have a stoppage condition defining a condition, the execution of programmed instructions further causing the controller to stop the conveying of the original sheet when the stoppage condition is satisfied, and
   wherein the stoppage condition includes a condition that a distance between a leading end of the next original sheet and the first scanning position is greater than a predetermined distance.

5. The image scanning apparatus according to claim 3,
   wherein the controller is configured to execute programmed instructions further causing the controller to have a stoppage condition defining a condition, the controller stopping conveying the original sheet when the stoppage condition is satisfied, and
   wherein the stoppage condition includes a condition that a trailing end of the original sheet has passed the second scanning position and scanning of the original sheet has been completed.

6. The image scanning apparatus according to claim 1,
   wherein the first scanning device is arranged on downstream, in the sheet conveying direction, with respect to the second scanning device, and
      wherein the controller is configured to execute programmed instructions further causing the controller to stop, in the stoppage process, conveying the original sheet when scanning of the original sheet has been completed and the trailing end of the original sheet has passed the first scanning position.

7. The image scanning apparatus according to claim 6,
   wherein the controller is configured to execute programmed instructions further causing the controller to determine, in the determination process, that light amount adjustment is to be executed when the distance between the leading end of the next original sheet and second scanning position is greater than a predetermined distance before scanning of the original sheet with the first scanning device is completed.

8. The image scanning apparatus according to claim 6,
   wherein the controller is configured to execute programmed instructions further causing the controller to execute, in the second adjustment process, the light amount adjustment in accordance with a plurality of scanning settings.

9. The image scanning apparatus according to claim 8,
   wherein the controller is configured to execute programmed instructions further causing the controller to execute, in the second adjustment process, the light amount adjustment in accordance with all the scanning settings.

10. The image scanning apparatus according to claim 8,
    wherein the controller is configured to execute programmed instructions further causing the controller to use a predetermined high scanning setting, which is the scanning setting for the highest image quality the image scanning apparatus is capable of providing, among the plurality of scanning settings if the second light amount adjustment is executed for the plurality of scanning settings.

11. The image scanning apparatus according to claim 10,
    wherein, for the scanning executed by the first scanning device, the controller is configured to execute programmed instructions further causing the controller to generate image data meeting the scanning setting included in the scanning instruction, based on scanning result of the first scanning device with use of the predetermined high scanning setting.

12. The image scanning apparatus according claim 10, wherein the controller is configured to execute programmed instructions further causing the controller to perform:
  a storing process in which, when the next original sheet is scanned at the predetermined high scanning setting, the result of scanning is stored in the non-volatile memory; and
  an image data generating process to generate image data meeting the scanning setting included in the scanning instruction for the next original sheet, based on the result of scanning stored in the non-volatile memory when the scanning instruction for the next original sheet is received.

13. The image scanning apparatus according to claim 1, wherein the controller is configured to execute programmed instructions further causing the controller to determine whether scanning of the original sheet has been completed based on at least one of:
  degree of skew of the original sheet as scanned;
  a setting of the scanning area; and
  a distance between two successively conveyed original sheets.

14. The image scanning apparatus according to claim 1, wherein the scanning instruction includes an instruction to execute a one-sheet scanning job which is a scanning job to be terminated when one sheet of original sheet has been scanned.

15. The image scanning apparatus according to claim 1, wherein the controller is configured to execute programmed instructions further causing the controller to execute the light amount adjustment of the scanning device which is to scan an original sheet every time one original sheet is scanned.

16. An image scanning apparatus, comprising:
  a conveyer configured to convey an original sheet;
  a first scanning device configured to scan an image on one surface of the original sheet conveyed by the conveyer at a first scanning position;
  a second scanning device configured to scan an image on another surface of the original sheet conveyed by the conveyer at a second scanning position, wherein the first scanning device is arranged on an upstream side, in a sheet conveying direction, with respect to the second scanning device; and
  a controller in operable communication with the conveyor, the first scanning device and the second scanning device,
  the controller is configured to execute programmed instructions stored in a non-volatile memory accessible by the controller, the execution of the programmed instructions causing the controller to perform:
    a completion determining process to determine whether scanning of a previous original sheet has been completed when a scanning instruction of the original sheet is received, wherein the controller starts scanning the previous original sheet as well as the original sheet when it is determined in the completion determining process that the scanning of the previous original sheet has not been completed;
    a first adjustment process to execute, in response to receipt of the scanning instruction, a light amount adjustment of the first scanning device before starting scanning of the original sheet subject to the received scanning instruction;
    a starting process to start conveying and scanning of the original sheet after executing the first adjustment process;
    a determination process to determine, after starting conveying the original sheet by executing the starting process, whether a light amount adjustment of the second scanning device is to be started;
    a second adjustment process to execute, when it is determined, in the determination process, to start the light adjustment of the second scanning device, the light adjustment of the second scanning device; and
    a stoppage process to stop conveying the original sheet such that the original sheet is not stopped at the first scanning position but is stopped before a next sheet reaches the first scanning position.

17. An image scanning apparatus, comprising:
  a conveyer configured to convey an original sheet;
  a first scanning device configured to scan an image on one surface of the original sheet conveyed by the conveyer at a first scanning position;
  a second scanning device configured to scan an image on another surface of the original sheet conveyed by the conveyer at a second scanning position, wherein the first scanning device is arranged on an upstream side, in a sheet conveying direction, with respect to the second scanning device; and
  a controller in operable communication with the conveyor, the first scanning device and the second scanning device,
  wherein the controller is configured to execute programmed instructions stored in a non-volatile memory accessible by the controller, the execution of the programmed instructions causing the controller to perform:
    a passage determination process to determine, when a scanning instruction is received, whether scanning of a previous original sheet has been completed and a trailing end of the previous original sheet has passed the second scanning position;
    a parallel adjusting process to execute, in parallel, the light amount adjustment of both the first scanning device and the second scanning device when a determination in the passage determination process is affirmative;
    a first adjustment process to execute, in response to receipt of a scanning instruction, a light amount adjustment of the first scanning device before starting scanning of the original sheet subject to the received scanning instruction;
    a starting process to start conveying and scanning of the original sheet after executing the first adjustment process;
    a determination process to determine, after starting conveying the original sheet by executing the starting process, whether a light amount adjustment of the second scanning device is to be started, wherein the determination process is executed after execution of the first adjustment process when a determination of the passage determination process is negative;
    a second adjustment process to execute, when it is determined, in the determination process, to start the light adjustment of the second scanning device, the light adjustment of the second scanning device; and
    a stoppage process to stop conveying the original sheet such that the original sheet is not stopped at the first scanning position but is stopped before a next sheet reaches the first scanning position.

18. An image scanning apparatus, comprising:

a conveyer configured to convey an original sheet;

a first scanning device configured to scan an image on one surface of the original sheet conveyed by the conveyer at a first scanning position;

a second scanning device configured to scan an image on another surface of the original sheet conveyed by the conveyer at a second scanning position, wherein the first scanning device is arranged on a downstream side, in a sheet conveying direction, with respect to the second scanning device; and a controller in operable communication with the conveyor, the first scanning device and the second scanning device, wherein the controller is configured to execute programmed instructions stored in a non-volatile memory accessible by the controller, the execution of the programmed instructions causing the controller to perform:

a start determining process to determine whether scanning of the original sheet has been started when a scanning instruction is received, wherein when it is determined in the start determining process that scanning of the original sheet has not been started, start both the light amount adjustment of the first scanning device and the light amount adjustment of the second scanning device in parallel, and wherein when it is determined in the start determining process that scanning of the original sheet has been started, the start determining process is executed after a first adjustment process is executed;

the first adjustment process to execute, in response to receipt of a scanning instruction, a light amount adjustment of the first scanning device before starting scanning of the original sheet subject to the received scanning instruction;

a starting process to start conveying and scanning of the original sheet after executing the first adjustment process;

a determination process to determine, after starting conveying the original sheet by executing the starting process, whether a light amount adjustment of the second scanning device is to be started;

a second adjustment process to execute, when it is determined, in the determination process, to start the light adjustment of the second scanning device, the light adjustment of the second scanning device; and a stoppage process to stop conveying the original sheet when scanning of the original sheet has been completed and the trailing end of the original sheet has passed the first scanning position.

* * * * *